United States Patent
Zhang et al.

(10) Patent No.: US 12,149,512 B2
(45) Date of Patent: Nov. 19, 2024

(54) SYSTEMS AND METHODS FOR PERMISSIONED BLOCKCHAIN INFRASTRUCTURE WITH FINE-GRAINED ACCESS CONTROL AND CONFIDENTIALITY-PRESERVING PUBLISH/SUBSCRIBE MESSAGING

(71) Applicant: University of Maryland, Baltimore County, Baltimore, MD (US)

(72) Inventors: Haibin Zhang, Ellicott City, MD (US); Sisi Duan, Ellicott City, MD (US); Yelena Yesha, Ellicott City, MD (US)

(73) Assignee: UNIVERSITY OF MARYLAND, BALTIMORE COUNTY, Baltimore, MD (US)

( * ) Notice: Subject to any disclaimer, the term of this patent is extended or adjusted under 35 U.S.C. 154(b) by 0 days.

(21) Appl. No.: 16/449,227

(22) Filed: Jun. 21, 2019

(65) Prior Publication Data
US 2019/0394175 A1    Dec. 26, 2019

Related U.S. Application Data

(60) Provisional application No. 62/687,849, filed on Jun. 21, 2018.

(51) Int. Cl.
*H04L 9/08*    (2006.01)
*G06Q 20/38*    (2012.01)
*H04L 9/40*    (2022.01)

(52) U.S. Cl.
CPC ..... *H04L 63/0435* (2013.01); *G06Q 20/3829* (2013.01); *H04L 9/085* (2013.01)

(58) Field of Classification Search
None
See application file for complete search history.

(56) References Cited

U.S. PATENT DOCUMENTS 10,764,160 B1 *  9/2020  Shtrauch ............... H04L 9/3239
10,893,044 B2 *  1/2021  Sun ....................... H04L 9/3231
(Continued)

FOREIGN PATENT DOCUMENTS

EP    3811560        4/2021
EP    3811560 B1     5/2024
(Continued)

OTHER PUBLICATIONS

Cachin, Christian, et al., ""Secure and Efficient Asynchronous Broadcast Protocols", IACR, International Association for Cryptologic Research", vol. 20010515:150301, Mar. 7, 2001 (Mar. 7, 2001), pp. 1-49, XP061000156.
(Continued)

*Primary Examiner* — Peter D Nolan
*Assistant Examiner* — Roy Rhee
(74) *Attorney, Agent, or Firm* — Kutak Rock LLP

(57) ABSTRACT

A multitude of systems and methods are provided. An encryption method and system utilizing vector label input threshold encryption is included, enabling decentralized confidentiality and decentralized, fine-grained, and attributed-based access control, enabling clients to define by whom, when, and how their data is accessed. Additionally, the disclosed systems and methods can include publish/subscribe mechanisms while achieving confidentiality-preserving and decoupled publish/subscribe messaging and strong total order for publications even with crytographic access control enforced.

12 Claims, 15 Drawing Sheets

(56) References Cited

U.S. PATENT DOCUMENTS

| | | | |
|---|---|---|---|
| 2012/0311684 A1* | 12/2012 | Paulsen | G06F 21/44 726/6 |
| 2013/0246791 A1 | 9/2013 | Di Crescenzo | |
| 2017/0207912 A1 | 7/2017 | Camenisch et al. | |
| 2017/0237725 A1 | 8/2017 | Camenisch et al. | |
| 2017/0257358 A1* | 9/2017 | Ebrahimi | H04L 9/3247 |
| 2017/0338955 A1* | 11/2017 | Geagan | H04L 63/0428 |
| 2017/0366516 A1* | 12/2017 | Pattanaik | H04L 63/0428 |
| 2018/0026796 A1 | 1/2018 | Oberheide et al. | |
| 2018/0227278 A1* | 8/2018 | Camenisch | H04L 9/0825 |
| 2018/0268386 A1* | 9/2018 | Wack | H04L 9/085 |
| 2019/0296907 A1* | 9/2019 | Versteeg | H04L 9/0894 |
| 2019/0347655 A1* | 11/2019 | Sewell | G06Q 30/08 |
| 2021/0089676 A1* | 3/2021 | Ford | H04L 9/0825 |

FOREIGN PATENT DOCUMENTS

| | | |
|---|---|---|
| KR | 20160061870 A | 6/2016 |
| WO | 2019246599 A1 | 12/2019 |

OTHER PUBLICATIONS

Kazemzadeh, Reza Sherafat, et al., ""PubliyPrime: Exploiting Overlay Neighborhoods to Defeat Byzantine Publish/Subscribe Brokers", Jan. 1, 2013 (Jan. 1, 2013 ), XP055876929", Retrieved from the Internet: URL:http://msrg.org/publications/pdf_files/2013/publiyprime-PubliyPrime:_Exploiting_Overlay_N.pdf.

Nikos, Komninos , et al., "Privacy Preserving Attribute Based Encryption for Multiple Cloud Collaborative Environment", 2015 IEEE/ACM 8th International Conference on Utility and Cloud Computing (UCC), ACM, Dec. 7, 2015 (Dec. 7, 2015), pp. 595-600, XP032881514, DOI: 10.11 09/UCC.2015.1 04.

Priyansh, Jain , ""The ABCs of Kafka in Hyperledger Fabric" Jun. 6, 2018 (Jun. 6, 2018), XP055876896,", Retrieved from the Internet: URL:https://codeburst.io/the-abcs-of-kafka-in-hyperledger-fabric-81e6dc18da56.

Victor, Shoup , et al., ""Securing Threshold Cryptosystems against Chosen Ciphertext Attack", Journal of Cryptology, Springer US, New York,", val. 15, No. 2, Jan. 1, 2002 (Jan. 1, 2002 ) pp. 75-96, XP037087780, ISSN: 0933-2790, DOI: 10.1 007/S00145-001-0020-9.

Zhao, Yuanyuan , et al., ""Dynamic Access Control in a Content-based Publish/Subscribe System with Delivery Guarantees", Distributed Computing Systems, 2006. ICDCS 2006. 26th IEEE International Conference on Lisboa", Portugal Jul. 4-7, 2006. Piscataway, NJ, USA, IEEE, Piscataway, NJ, USA, Jul. 4, 2006 (Jul. 4, 2006), pp. 60-60, XP01 0927365, DOI: 10.11 09/ICDCS.2006.32.

"Communication under Rule 71(3) for European Patent Application No. 19823567.3 Mailed on Jan. 1, 2024."

"Extended European Search Report for European Application No. 19823567.3 dated Feb. 14, 2022".

Decision to Grant a European Patent pursuant to Art. 97(1) EPC for Patent Application No. 19823567.3, mailed Apr. 18, 2024.

"International Preliminary Report on Patentability for International Application PCT/US2019/038609, Report issued On Dec. 22, 2020, Mailed On Dec. 30, 2020.".

"International Search Report and Written Opinion for International Application No. PCT/US2019/038609, mailed on Oct. 8, 2019, 13 pages".

* cited by examiner

| |
|---|
| $L_1$: $R_1$, $R_2$ |
| $L_2$: $R_3$, $R_4$, $R_5$ |
| $L_3$: $R_6$ |

| |
|---|
| $L_1$: $R_1$, $R_2$, $R_3$ |
| $L_2$: $R_4$, $R_5$ |
| $L_3$: $R_6$ |

| |
|---|
| $L_1$: D.C. Doctors |
| $L_2$: Lung Cancer Expert |
| $L_3$: No Malpractice |
| $L_4$: > 10 Year Licence |

| |
|---|
| VectorSize, $L_1$size, $L_1$, $L_2$size, $L_2$, ..., $L_{vectorsize}$, $L_{vectorsize}$ |

Fig. 4

| sn | cid | ts | op | p | ac | attributes |
|----|------|----|-------|-------|--------|-------------------------------|
| 0 | 1000 | 4 | pub | $m_0$ | NULL | price="105" |
| 1 | 1001 | 6 | write | $m_1$ | 101 | NULL |
| 2 | 1000 | 10 | pub | $m_2$ | 100,101 | price="105", county="Orange" |

Data Blocks

| attributes | S-PS |
|---------------|---------|
| price="105" | 0-0,2-1 |
| county="Orange" | 1-0 |

Publication Order Indices

SYSTEMS AND METHODS FOR PERMISSIONED BLOCKCHAIN INFRASTRUCTURE WITH FINE-GRAINED ACCESS CONTROL AND CONFIDENTIALITY-PRESERVING PUBLISH/SUBSCRIBE MESSAGING

CROSS-REFERENCE TO RELATED APPLICATIONS

This application claims priority pursuant to 35 U.S.C. § 119(e) to U.S. Provisional Patent Application Ser. No. 62/687,849, filed Jun. 21, 2018, the entire disclosure of which is incorporated herein by reference.

FIELD OF THE INVENTION

The present invention relates generally to systems and methods for Byzantine Fault-Tolerant and blockchain infrastructure. More specifically, the present invention is concerned with systems and methods for BFT and permissioned blockchain infrastructure with decentralized, attribute-based, and fine-grained access control and confidentiality-preserving publish/subscribe messaging.

BACKGROUND

It is known that Byzantine Fault-Tolerant (BFT) state machine replication, or simply BFT, is the model for permissioned blockchains, where distributed nodes or ledgers know the identities of each other but may not trust each other. The claims work for BFT systems (protocols) and permissioned blockchain systems.

Publish/subscribe (pub/sub) systems enable disseminating information from publishers (information sources) to subscribers (interested recipients) via an overlay of brokers (which may be described as servers, proxies, and/or replicas). Publishers advertise information to the brokers and send publications as previously advertised. Subscribers send brokers subscriptions to express their interests. Brokers store subscriptions received from subscribers, and upon receiving matching publications from publishers, brokers send the corresponding publications to the interested subscribers. In addition to storing subscriptions, brokers may maintain routing tables to deliver information to subscribers.

Almost all pub/sub systems only tolerate crash failures, and only a handful of papers describe how to partially handle Byzantine failures. There exists a need for a provable-security treatment of Byzantine pub/sub systems achieving strong consistency that defends against an arbitrary number of Byzantine faulty clients (publishers and subscribers), and a fraction of Byzantine faulty brokers.

In addition, it is challenging in pub/sub systems to enable decentralized confidentiality and access control, while still maintaining the decoupling property of pub/sub systems. Such a system would provide a single system which would be adaptable to a wide range of use cases while still being supported by a single common architecture. Accordingly a need exists for such a system, without sacrificing efficiency, yet still attaining scalability.

A blockchain is an immutable distributed ledger for storing and processing transactions. As a promising technology transforming business models, there has been a large number of industry implementations of blockchains. Despite increased adoption of the blockchain technology, significant challenges and limitations exits that have to date inhibits its expansion. The instant disclosure considers, but is not limited to, permissioned blockchains, where ledgers know the identities of each other but may not trust each other. Additionally, data governance approaches herein are configurable for permissionless blockchains, where ledgers can join and leave the network dynamically.

Conventional blockchains provide integrity and availability, but they do not offer confidentiality on user transactions or blockchain state. As a result, these blockchains have so far been mostly explored and deployed in settings where confidentiality is of little to no concern, such as food supply chain traceability. As more blockchain uses cases are explored, the blockchain community is increasingly realizing that there are few applications with little or no privacy concerns. Companies and government agencies are reluctant to share their private databases. Customers would rather continue using cloud based data storage rather than put data into open blockchains.

Regulations have been implemented which are designed to safeguard the privacy and security of individual information which establish a set of rules that any new application must conform with to be considered viable. Recent examples include the California Consumer Privacy Act of 2018, European Union General Data Protection Regulation of 2016, and the Health Information Technology for Economic and Clinical Health Act of 2009. These Acts include provisions that, from a securing perspective, mean that conventional blockchains lacking confidentiality cannot be used for regular data storage.

Achieving some confidentiality is possible for clients by encrypting their own data, but this has its own inherent limitation in that no one except the clients themselves are configured to access or use the encrypted data. Thus, blockchain confidentiality is strongly tied to access control, a process by which clients are granted access to certain transactions or sever states based upon certain rules. The community has long desired blockchains where clients define by whom and how their data is accessed, preferably not just role-based but also attributed-based.

Consider, as an example, health records. An ideal situation is that patients decide by whom, when, and how their health records are viewed or used. Patients should be able to decide which doctors see their records, either exactly (by name), or those that meet certain conditions (e.g., "D.C. area doctors", "more than 15 years practice in lung cancer", "no malpractice history").

Some popular blockchains, such as Ethereum and Hyperledger Fabric, attempt to achieve non-cryptographic access control. In Ethereum, most applications do not store bulk data on the blockchains due to the high cost of storing data. Instead, applications store only the data hashes and may store the access control policy along with the hashes. The bulk data is either stored at the client side (in which case clients need to always be online and maintain data availability) or at other external storage servers (which, in turn, need to be protected). In Fabric, clients run off-chain smart contracts and clients need to take care of privacy themselves before contracts are put to blockchains in plaintext. Both approaches present significant ease of use, reliability, and/or security issues. On the other hand, confidentiality and fine-grained access control may be realized using the idea of trusted execution environments (TEEs), e.g., Intel SGX. Even the most popular TEE platform, SGX, is "still in its infancy," and recent security vulnerabilities found have raised many questions and concerns about the security of SGX. Up to date, there are no known open-source, or validated TEE platforms.

While one may use attribute-based encryption (ABE) to achieve fine-grained access control, they all suffer from the following problems: 1) Efficient ABE schemes rely on relatively slow pairing-based cryptography. 2) All these systems use a trusted central authority which is a single point of failure. While the so-called decentralized ABE schemes exist, decentralization here actually means that anyone can serve as an ABE authority by creating a public key and issuing private keys to different users, but it does not mean that the keys are generated interactively among distributed nodes.

Accordingly, it would be advantageous to have a blockchain system which achieves decentralized confidentiality and decentralized, fine-grained and attribute-based access control, so clients define by whom, when, and how their data are accessed utilizing cryptography only, without relying on trusted execution environments.

Publish/Subscribe (also known as pub/sub) is a messaging pattern aiming to decouple senders (publishers) and receivers (subscribers). Pub/sub systems are extremely popular, including MQTT and Amazon SNS. While blockchains offer several functionalities, from storage to general processing via smart contracts, they do not have pub/sub. There is no Byzantine Fault-Tolerant (BFT) storage, processing, and pub/sub system in existence. This is in sharp contrast to crash fault-tolerant (CFT) solutions which do have these features. For example, Apache Kafka is an extremely popular CFT platform that bundles these functions together.

Supporting a blockchain with pub/sub would enable anonymity between different groups of clients by virtue of its intrinsic decoupled nature. Decoupling for blockchains allows service provides and service consumers to receive and send payments respectively for data sent over the blockchain service without exposing identities. Blockchain with pub/sub would also support dynamic client membership and allow service scalability.

It has been, however, challenging to design a reliable BFT pub/sub system. To guarantee that subscribers receive relevant publications in the same order (publication total order) is difficult. Existing constructions only achieve weak reliability. Further, it is extremely hard to have confidentiality preserving pub/sub systems without sacrificing the decoupling feature of pub/sub itself. Publishers and subscribers would need to negotiate cryptographic keys for secure communications, but the decoupling feature requires that publishers and subscribers do not know each other. Some existing protocols aim to achieve BFT pub/sub via a black-box usage of existing blockchains (e.g., Tendermint, Hyperledger Fabric). Systems of this kind only achieve weaker consistency compared to our systems and are orders of magnitude slower than our system which uses a direct, non-black-box design.

Accordingly, it would be advantageous to have a system of BFT and confidentiality-preserving blockchain and pub/sub while maintaining a strong reliability of distribution and cryptography. Furthermore, it would be advantageous to achieve publication total order and confidentiality-preserving pub/sub messaging while maintaining the decouple features of pub/sub.

Another significant challenge for blockchains is that it is hard to perform data governance or management for applications with open networks where clients may upload malicious, inappropriate, or illegal content to blockchain servers. For instance, say that a local law enforcement department would like to leverage blockchain to allow citizens to provide residential video to assist with the investigation of a crime. It is possible that some residents (who may be of mal-intent), or adversaries, will upload disturbing or illegal content to the blockchain. Indeed, malicious clients may use open blockchains as a content distribution channel to distribute inappropriate information. Due to the immutability property of blockchain, these attacks would be particularly devastating.

Accordingly, it would be advantageous to have a data governance system integrated within a blockchain system, so as to prevent malicious use of the blockchain as an illegal distribution network.

There is a growing consensus that there is no on-size-fits-all blockchain, as has at other times been argued. Indeed, a variety of BFT protocols have been proposed to meet different needs (e.g., latency, throughput, scalability, robustness, bandwidth, and/or asynchrony). However, a flexible system which allows the user to scale tradeoffs about security, efficiency, and robustness of various aspects of the blockchain would allow for a user to adapt the blockchain for their use while still adhering to a centralized platform.

Accordingly, it would be advantageous to have a modular and extensible permissioned blockchain platform which allows for various trade-offs among efficiency, function, and security.

SUMMARY

Various embodiments of the present invention can provide systems and methods for vector-label-input threshold encryption. Conventional labeled-threshold encryption takes a single string as the label. Described herein are systems and methods which can use a vector of strings as a label within labeled-threshold encryption. The labels support a variable number of vectors within the label, each vector being of variable length. This allows a variable number of attributes to be included within a label, enabling vector-based, fine-grained access control rules to be incorporated within an encryption scheme. The systems and methods also contemplate a label devoid of vectors, and vectors which are they themselves empty. Such a scheme enables selective fine-grained access control rules, such that a wide range of attributes stored in the vector label could greatly restrict access to the encrypted data whereas an empty label indicates no access to any participants. It will be appreciated that in some embodiments the decryption keys are given to servers. In some embodiments, the system may by default allow the client who sent the threshold encryption ciphertext to have access to the data automatically or not, all depending on the system or application setup.

Further embodiments of the present invention can provide systems and methods for fine-grained and attribute-based access control in a BFT system or a BFT-based permissioned blockchain. The systems can consist of clients and servers. Servers can also be referred to as brokers or replicas. The systems and methods can comprise one or more of three routines: client registration, write, and read.

Within the systems and during the methods, clients can register with servers, such registration including one or more attributes of the clients. Clients can then authenticate themselves with the servers. During the registration process, the systems can collectively verify and store the client attributes. The servers can run a BFT protocol to ensure the registration information is consistent among the servers. In some embodiments, the BFT protocol includes assigning a sequence number to the registration transaction and subsequently storing the registration transaction in a sequence number order. In the event the verification fails, the servers will discard the transaction. Once the client receives a calculable number of matching replies sufficient to satisfy BFT protocol, the client can end the registration routine.

The systems and methods can continue with the write routine. To begin the write routine, a client takes as inputs a variety of variables and computes a threshold encryption ciphertext. In some embodiments, where the encryption is labeled input threshold encryption, a label is incorporated within the ciphertext or within a labeled ciphertext. The client can then sends, or broadcasts, the ciphertext or labeled ciphertext as a write transaction to be executed by one or more servers. Upon receiving a client transaction, one or more servers can run a BFT protocol to order the transaction by assigning a sequence number to the transaction, store the transaction, and execute an associated operation in sequence number order. The one or more servers can then send replies to the write requests which, in some embodiments, contains executed client request. Once the client receives a calculable number of matching replies sufficient to satisfy BFT protocol, the client can end the write routine.

The systems and methods, in some embodiments, can continue with a read routine. In some instances, read transactions are ordered, but the read transactions do not alter the overall state of the system. Thus, the systems are configurable to operate without ordered read transactions. The read routine can begin when a client sends a read request for a particular transaction previously associated with the system. Upon receiving a read transaction, one or more servers can decide if the client is authorized to receive the particular transaction by checking one or more access control policies associated with the particular transaction. In the event that the system determines that the client is allowed to have access to the particular transaction, each server associated with the system can send the client its unique decryption share and the sequence number previously assigned to the labeled ciphertext associated with the transaction. Once the client receives a calculable number of matching transactions with valid decryption shares sufficient to satisfy BFT protocol, the client can run a combination operation to obtain the message of the transaction in plaintext.

The systems and methods, in yet further embodiments, can be configured for publish/subscribe architecture with a BFT-based blockchain. In some embodiments, publishers and subscribers register with servers. In some embodiments, such registration includes provided the servers with one or more attributes. In some embodiments, publishers advertise to the servers publication types, which the system passes to the subscribers. Subscribers then submit subscription interests, which are stored by the servers. In some embodiments, the servers store such attributes in an ordered fashion. In some embodiments, publishers submit encrypted publications to the server. In some embodiments, such submissions include a label. In some embodiments, the label is a vector. In some embodiments, the server orders publication along with the publications previously processed by the system. In some embodiments, the servers determine which subscribers are both authorized and interested to receive the publications. In some embodiments, the servers compare stored attributes against publication attributes and access control rules to make this determination. In some embodiments, the servers then deliver, in order, the publications to the authorized subscribers. In some embodiments, upon receiving a calculable threshold of deliveries from the servers, the subscriber delivers the publication in plaintext.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION

Various embodiments of the invention, illustrative of the best mode in which the applicant has contemplated applying the principles, are set forth in the following description and is shown in the drawings.

FIG. 4 is an example of a vector label according to another embodiment of the present invention.

DETAILED DESCRIPTION

Figure 1:
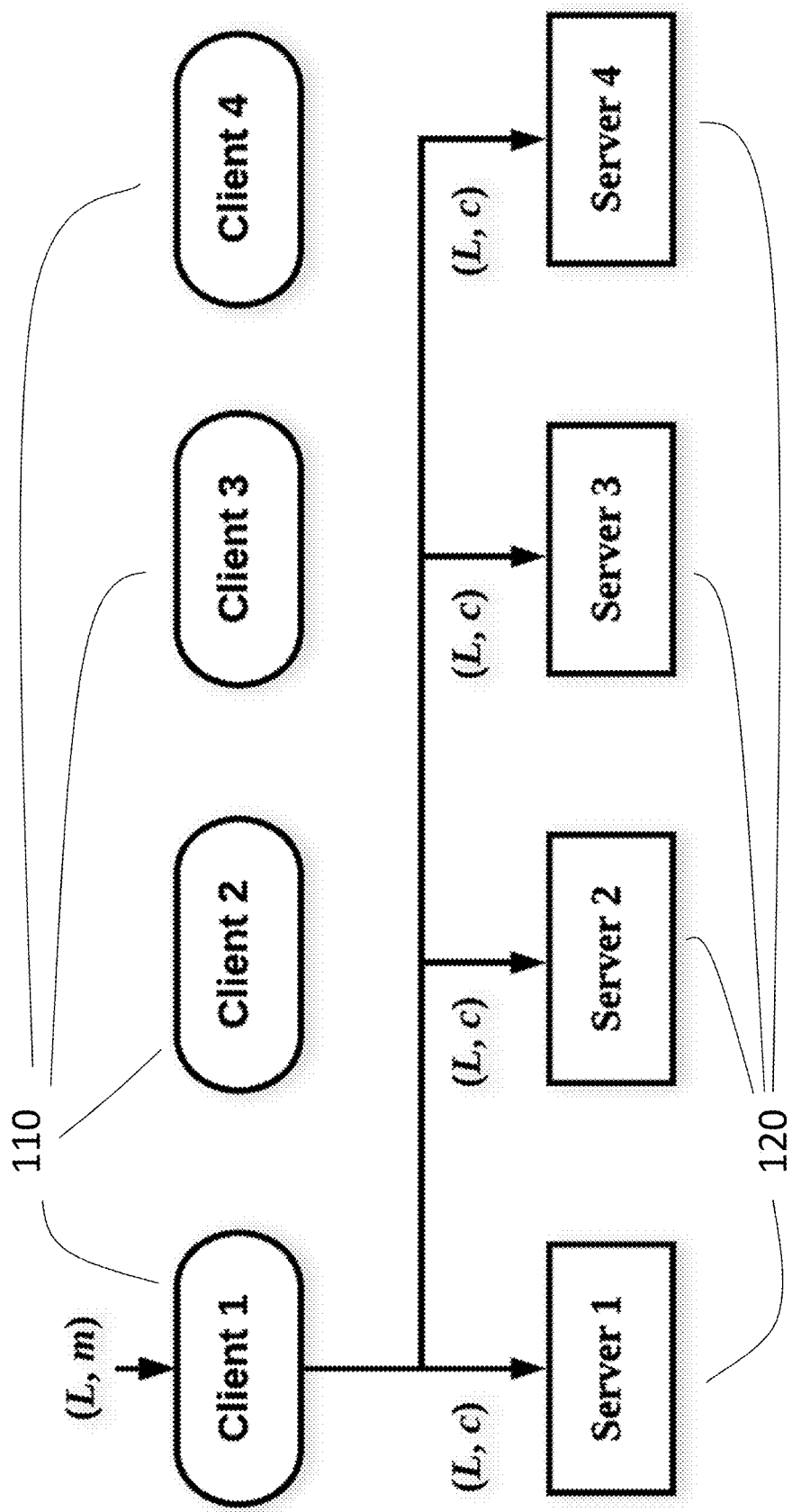
FIG. 1 is a flowchart showing an encoding step of threshold encryption, according to one embodiment of the present invention.

As required, a detailed description of the various embodiments of the present invention are disclosed herein; however, it is to be understood that the disclosed embodiments are merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The following defines syntax and notation which is used through the application and in the figures, provided for readability of the present application.

To facilitate reference to the notation used, the following is a summary: m is an operation (transaction, message); n is the number of servers (or brokers, replicas); t is the threshold for threshold encryption, signature, and PRF, set as f+1 herein; f is the upper bound of the number of faulty servers; cid is the client identity; ts is a timestamp (an increasing sequence number herein); tid is a unique tag or unique session ID; A is an adversary; N is the number of potential subscribers; I is a security parameter; L is a label for threshold encryption and/or a vector in a space for all vectors; op is an operation type; hr is a header for a publication; p is a publication (a special transaction); ac is access control rules; and sn is a sequence number assigned to each transaction by BFT servers. $[A_1 \ldots A_s]$ denotes the set $\{A_1, \ldots, A_s\}$ and the terms are utilized interchangeably.

Continuing syntactically, a (t,n) threshold encryption scheme consists of one or more algorithms. A probabilistic key generation algorithm TGen takes as an input a security parameter l, the total number of servers associated with the system n, and a thresholder parameter t and provides an output. This output is (pk, vk, sk), where pk is a public key, vk is a verification key, and sk=$(sk_1, \ldots, sk_n)$ is a list of private keys. A probabilistic encryption algorithm TEnc takes as inputs a public key pk, a message m, and a label L, and outputs a decryption share $\tau$. A deterministic share verification algorithm Vrf takes as input the verification key vk, a ciphertext c, a label L, and a decryption share $\tau$, and outputs b$\in\{0,1\}$. In some embodiments, a deterministic combining algorithm Comb takes as input the verification key vk, a ciphertext c, a label L, a set of t decryption shares, and outputs a message m, or $\bot$ (a distinguished symbol). Such threshold encryption is configured to be secure against an adversary that controls up to t−1 servers.

Continuing syntactically, threshold signatures are where a public key is associated with the system and a private key is shared among all the servers. A (t, n) threshold signature scheme consists of the following algorithms. A probabilistic key generation algorithm TGen takes as input a security parameter l, the number n of total servers, and threshold parameter t, and outputs (pk, vk, sk), where pk is the public key, vk is the verification key, and sk=$(sk_1, \ldots, sk_n)$ is a list of private keys. A probabilistic signature share generation algorithm TSig takes as input a public key pk, a message m, a private key $sk_i$, and outputs a signature share $\sigma_i$. A deterministic share verification algorithm Vrf takes as input the verification key vk, a signature share $\sigma'$, and outputs a bit b$\in\{0, 1\}$. A deterministic combining algorithm Comb takes as input a verification key vk, a set of t signature shares, and outputs a signature $\sigma$, or $\bot$ (a distinguished symbol). A deterministic signature verification algorithm SV takes as input a verification key vk, a public key pk, a message m, a signature $\sigma$, and output b$\in\{0, 1\}$.

The threshold signature is unforgeable against an adversary that controls up to t−1 servers. Additionally, the threshold signature is robust in the sense that no adversary can produce t valid signature shares such that the output of the share combining algorithm is not a valid signature.

Continuing syntactically, a (t, n) threshold PRF scheme for a function F consists of the following algorithms. A probabilistic key algorithm FGen takes as input a security parameter l, the number n of total servers, and threshold parameter t, and outputs (pk, vk, sk), where pk is the public key, vk is the verification key, and sk=$(sk_1, \ldots, sk_n)$ is a list of private keys. A PRF share evaluation algorithm Eva which takes as a PRF input c, pk, and a private key $sk_n$, and outputs a PRF share $y_1$. A deterministic share verification algorithm Vrf takes as input the verification key vk, a PRF input c, and a PRF share $y_2$, and outputs b$\in\{0, 1\}$. A deterministic combining algorithm FCom takes as input the verification key vk, x, and a set of t valid PRF shares, and outputs a PRF value y'.

The threshold PRF is secure against an adversary that can corrupt t−1 servers. The threshold PRF value is unpredictable against an adversary that controls up to t−1 servers and can choose the PRF input. The threshold PRF is robust in the sense the combined PRF value for c is equal to F(c). A direct implementation of threshold PRF or a threshold PRF using any threshold signatures is contemplated.

Continuing syntactically, broadcast encryption enables transmitting encrypted content over a broadcast channel so that only users qualified can decrypt the content. Broadcast encryption can flexibly deal with a dynamically changing group of qualified users. Broadcast encryption requires a trusted party (which in some embodiments is the broadcaster) to set up the system key and user keys. A broadcast encryption is said to be (t, n) collusion-resistant if for any adversary who learns the secret keys of at most t−1 revoked users, the broadcasts do not leak any information to the adversary.

In broadcast encryption, the broadcaster is assumed to be trusted. However, if a broadcaster is faulty, different recipients receive different contents. The present invention contemplates a soundness notion of broadcast encryption. Specifically, even a malicious broadcaster is infeasible to generate a ciphertext that could be decryptable into different plaintexts with different valid recipients.

A broadcast encryption system consists of the following three algorithms. A probabilistic key generation algorithm BGen takes as input the total number of potential receivers N, and outputs N private keys $\{d_i\}_{i=1}^N$. A probabilistic encryption algorithm BEnc takes as input a subset S$\subseteq$[1 ... N], private keys $\{d_i\}_{i=1}^N$, and a message m, and outputs (S, hdr, k, $C_k(m)$), where hdr is a header and C is a symmetric encryption algorithm. The broadcast encryption ciphertext consists of (S, hdr, $C_k(m)$). A deterministic decryption algorithm takes as input a subset S$\subseteq$[1 ... N], a user id i$\in$[1 ... N], the private key di for user i, and a header hdr, and outputs k used to decrypt the symmetric ciphertext.

A broadcast encryption is said to be (t, n) collusion-resistant if for any adversary who learns the secret keys of at most t−1 revoked users, the broadcasts do not leak any information to the adversary. In broadcast encryption, if a broadcaster is faulty, different recipients obtain different plaintexts.

Referring generally to the figures, the systems and methods described herein consider a unified model for BFT SMR 300 and publication/subscribe (pub/sub) 400 protocols (or BFT storage, processing, and pub/sub protocols), where replicas perform the blockchain operations (storage and processing) and the pub/sub operations.

In some embodiments, publishers 412 and subscribers 414 are a subset of clients 310, and a client 310 may be neither a publisher 412 nor a subscriber 414. In some embodiments, publishers 412 are subscriber 414 and vice versa. The present application uses brokers, servers 320, and replicas interchangeably and uses operations and transactions interchangeably.

In some embodiments, the BFT SMR 300 and pub/sub 400 system comprise one or more of the following operations: registration, write, read, advertise, sub, pub, and/or notify. In some embodiments, the listed operations are configured to be interactive. In some embodiments, an interactive registration algorithm reg is run by clients 310 and servers 320. Through the reg algorithm, new clients 310 are registered in the system. In some embodiments, the reg algorithm also enables the servers 320 to verify and store the attributes of clients 310. Clients 310 should be able to register independently, and in particular, potential publishers 412 and subscriber 414 need not to know one another. In some embodiments, a client 310 does not need to decide at this stage if the client 310 would like to register as a publisher 412, a subscriber 414, or both, but rather does this later via advertise and sub. In some embodiments, a write operation changes the server 320 state. In some embodiments, a read operation does not change the server 320 state. In some embodiments, the operations advertise, sub, and pub are special pub/sub related write operations, and like any write operations, all these operations are delivered at the servers 320. In some embodiments, the corresponding requests are totally ordered. In some embodiments, a notify operation is triggered by a pub operation and will be delivered at the subscribers.

In some embodiments, publishers 412 advertise to the replicas information that will be sent to clients. In some embodiments, the advertise messages are viewed as special publications sent to all or a subset of clients. Subscribers 414 send brokers subscriptions to express their interests via a sub operation. Brokers store subscriptions received from subscribers 414. Upon receiving matching publications from publishers 412 via a pub operation, brokers send the corresponding publications to the interested subscriber 414 via a notify operation.

In some embodiments, a client 310 sends an encrypted transaction together with access control rules ac to the system. In some embodiments, authorized clients 310 (specified in ac) run an interactive protocol with replicas to obtain the transaction in plaintext. Access control in the systems and methods is general and is either role-based or attribute-based, or both.

In some embodiments, the secure BFT SMR and pub/sub system achieves integrity, availability, confidentiality against corrupted servers, confidentiality against non-subscribers, and fine-grained access control. In some embodiments, as in a BFT system 300, a strong adversary that can passively corrupt f out of n replicas and adaptively corrupt an unbounded number of clients 310 is assumed.

The systems and methods contemplate the concept of Agreement. If any correct replica delivers an operation m, then every correct replica delivers m. In some embodiments, if any correct subscriber 414 delivers a publication m matching its subscription, then every correct subscriber 414 with the same subscription delivers m.

The systems and methods contemplate the concept of Total Order. If a correct replica has delivered $m_1, m_2, \ldots, m_s$ and another correct replica has delivered $m'_1, m'_2, \ldots, m'_{s'}$, then $m=m'$ for $1 \leq i \leq \min(s, s')$. In some embodiments, the systems and methods contemplate the concept of Publication Total Order. If a correct subscriber 414 has delivered $m_1, m_2, \ldots, m_s$ with a subscription T and another correct subscriber 414 has delivered $m'_1, m'_2, \ldots, m'_{s'}$ with the same subscription T, then $m=m'$ for $1 \leq i \leq \min(s, s')$.

The systems and methods contemplate the concept of Liveness. If an operation m is submitted to n–f correct replicas, then all correct replicas will eventually deliver m. If a publisher 412 is correct and submits m matching a subscription T, then all correct subscribers 414 that issued a subscription T will eventually deliver m. If a subscriber 414 issues a subscription T, it will receive all publications matching T.

The systems and methods contemplate the concept of Authentication (not the conventional sense of message authentication). In some embodiments, if a subscriber 414 delivers a publication, then the publication was published by some publisher 412.

The systems and methods contemplate the concept of Uniqueness. In some embodiments, a subscriber 414 delivers no publications twice, ensuring each delivery is unique.

The systems and methods contemplate the concepts of confidentiality and access control. For the present application, a unified definition of security covering all confidentiality aspects access control as specified by data providers and confidentiality for non-subscribers and servers is provided. Specifically, given a BFT SMR 300 and pub/sub 400 system, the following example applies to an adversary A.

A chooses to corrupt a fixed set of servers. A interacts with honest parties arbitrarily and chooses to corrupt clients 310 adaptively. A selects two messages $m_0$ and $m_1$, an ac, and a unique tag tid that specifies an instance, and submits them to the encryption oracle for the system. A cannot corrupt any clients 310 specified by ac (otherwise, A would have trivially won the game in this example). The oracle randomly selects a bit b and computes an encryption c of mb with ac and tid, and sends the ciphertext to A. A interacts with honest parties arbitrarily subject only to the following two conditions that 1) A cannot ask the decryption oracle for the ciphertext c with ac and tid, and 2) A cannot corrupt any clients 310 specified by ac. Finally, A outputs a bit b'. The advantage of the adversary A is the absolute difference between ½ and the probability that b'=b. Under this definition, it is easily shown to imply input causality (causal order), which prevents the faulty replicas from creating an operation derived from a correct client's bit that is delivered (and so executed) before the operation from which it is derived.

In some embodiments, the broker nodes the system will be deployed in dedicated servers 320, or in the global data centers, preferably, with a different number of cloud service providers (e.g., Amazon, Google, IBM, Microsoft). Such servers or data centers are typically placed in strategic locations, have well provisioned resources and bandwidth, and are easily and widely accessed by end customers. In yet other embodiments, broker nodes are also deployed in a setting similar to the one mentioned above, as long as the architecture has well provisioned resources, bandwidth, and easy accessibility.

The following educates on how the systems and methods achieve availability and integrity. In some embodiments, the brokers run a BFT protocol to maintain a consistent system state, ensuring publications are delivered to all interested recipients, and ensuring the notifications are delivered in the same total order. In some embodiments, each subscriber 414 must maintain a log of notifications, and deliver the notifications according to the order determined by the BFT protocol. As an example, if any message m is delivered to some correct subscriber 414, the message will be also delivered by all correct interested subscribers 414. If two different correct subscribers 414 deliver two sets of messages, then the two sets of the messages are delivered in the same order, i.e., the notifications with total order are delivered to the interested subscriber 414 by all brokers. If the publisher 412 is correct, all interested subscriber 414 will deliver the message sent by the publisher 412. In some embodiments, where the system in configured to use labeled threshold encryption for publications, all interested and authorized subscribers 414 will deliver the notifications with total order.

Next, the following educates how the systems and methods achieve confidentiality and distributed, fine-grained access control. In some embodiments, a public key of a threshold encryption scheme is associated with the system, while a secret key is shared among all relevant brokers. In some embodiments, instead of sending publications in cleartexts, publishers 412 now first encrypt the publications using labeled threshold encryption. More specifically, publishers 412 encrypt the underlying payload data in publications while putting the metadata and access control information (in cleartexts) to the label part of the ciphertexts. In some embodiments, for efficiency reasons, the systems and methods use hybrid encryption. In some embodiments, the brokers then run the BFT protocol on the labeled ciphertexts instead of plaintexts. The brokers match publications with subscriptions using the metadata in the label part of the ciphertexts, and also using the access control information. Each of said brokers then broadcast the decryption shares to subscribers 414 that are both interested in the publications and are qualified to receive the publications. Subscribers 414 verify the correctness of decryption shares and then combine the valid decryption shares to obtain the payload data. In some embodiments, brokers will not see the shared information in cleartexts throughout the process, unless more than f out of n brokers collude. This is a strong security guarantee where the adversary has to corrupt at least f+1 out of n brokers.

In some embodiments, the systems and methods use a novel combination of broadcast encryption and threshold encryption. More specifically, labeled threshold encryption is used to distribute and manage the user keys of the broadcast encryption scheme. In some embodiments, the systems and methods leverage the native revocation functionality of broadcast encryption to maintain a dynamically changing set of qualified subscribers. To defend against malicious publishers 412 to send broadcast ciphertexts that are decryptable into different plaintexts by different subscribers, the typical broadcast encryption is enhanced with a soundness security notion.

Referring to FIGS. 1-4, in some embodiments, the systems and methods utilize encryption. In some embodiments, said encryption is threshold encryption. In some embodiments, the encryption incorporates a label, one embodiment of which is depicted in FIG. 4. In some embodiments, this label is a vector. In some embodiments, the vectors are of variable number and length. Conventional labeled threshold encryption takes a single string as the label. The systems and methods herein extend threshold encryption to support a vector of strings $L=(L_1, \ldots, L_s) \in \{0, 1\}^{}$ as labels. For the purposes of this description, a vector is a sequence of zero or more strings, and $\{0, 1\}^{}$ denotes the space of all vectors. In some embodiments, the vector-label-input (VLI) threshold encryption, is unique in handling labels. The systems and methods support an arbitrary, or variable, number of vectors, each of which are configured to be of arbitrary, or variable, length. In some embodiments, such a data structure enables vector-based, fine-grained access control rules.

In some embodiments, VLI threshold encryption schemes are derived from existing threshold encryption schemes. In some embodiments, one can use a new hash function on the vector label inputs. The new hash function takes as input the vector labels and outputs a unique output. There are many ways of constructing such a hash function. For instance, on input label $L=(L_1, \ldots, L_s) \in \{0, 1\}^{**}$, a hash function $H_1$ is defined by using an existing hash function H (e.g., SHA2) as follows: $H_1(L)=H_1(L_1, \ldots, L_s)=H(H(1, |L_1|, L_1), \ldots, H(s, |L_s|, L_s), s)$, where |.| denotes the bit-length of the input, e.g., $|L_1|$ is the bit-length of $L_1$. Then $H_1(L)$ is fed to the original threshold encryption scheme as the label. In some embodiments, the vector label input threshold encryption as described herein is provably secure against CCA attacks. For instance, one can extend commonly known threshold encryption schemes to be a VLI threshold encryption scheme using the aforementioned approach. The devised scheme is secure under the Decisional Diffie-Hellman (DDH) assumption in the random oracle model (ROM). In some embodiments, this is extended to show that the vector label input threshold encryption is also secure against CCA attacks, under the DDH assumption in the ROM.

Figure 2:
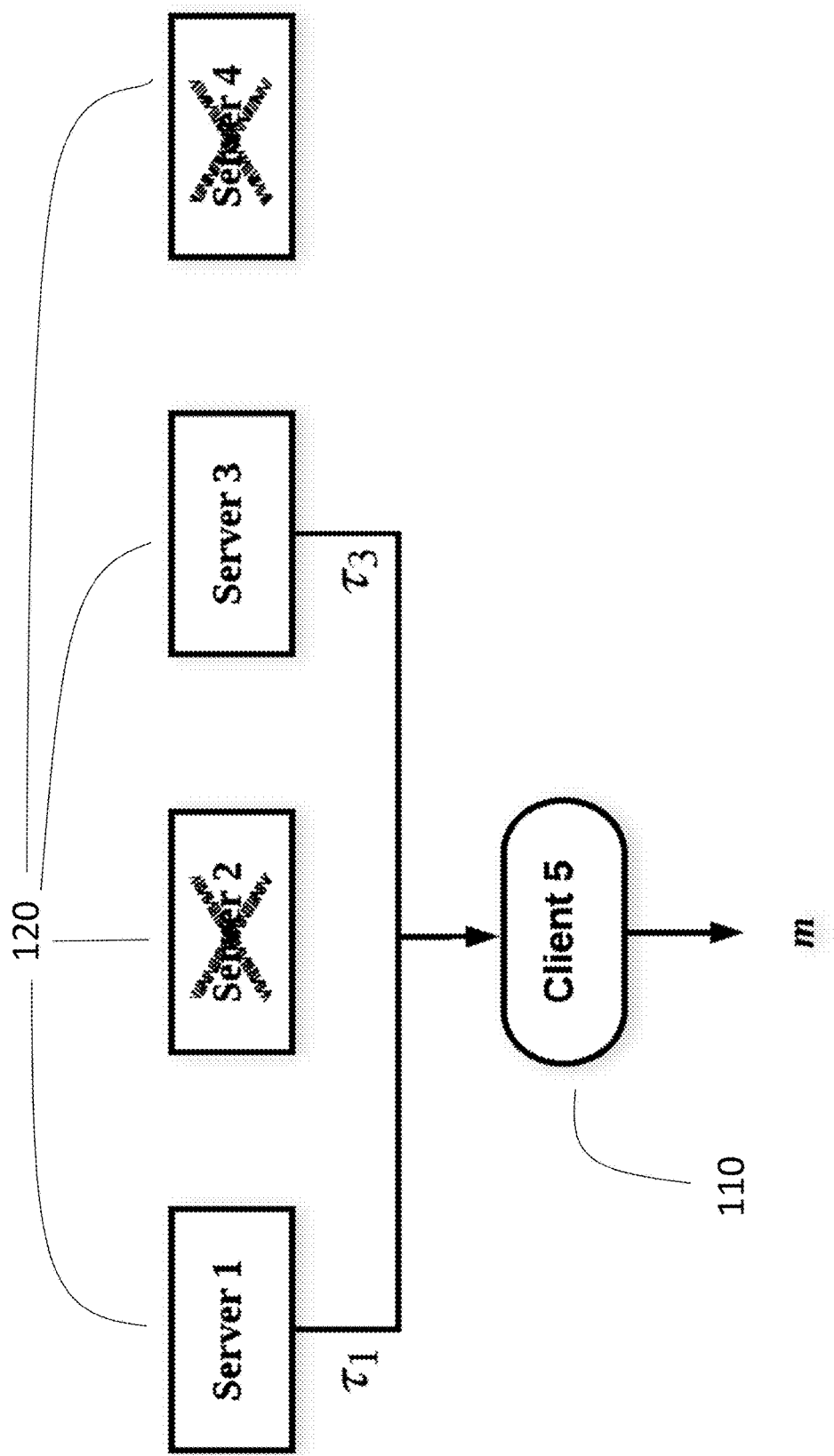
FIG. 2 is a flowchart showing a decoding step of threshold encryption, according to the embodiment of FIG. 1.

In some embodiments, such encryption utilizes a messaging system with a label L and message m. One or more clients 110 utilize the label and message to generate ciphertext c, which is then passed to one or more servers 120, as shown in FIG. 1. FIG. 2 depicts a threshold number of servers 120 sending to a client 110 a decryption share, which client 110 utilizes to access message m in plaintext.

Figure 17:
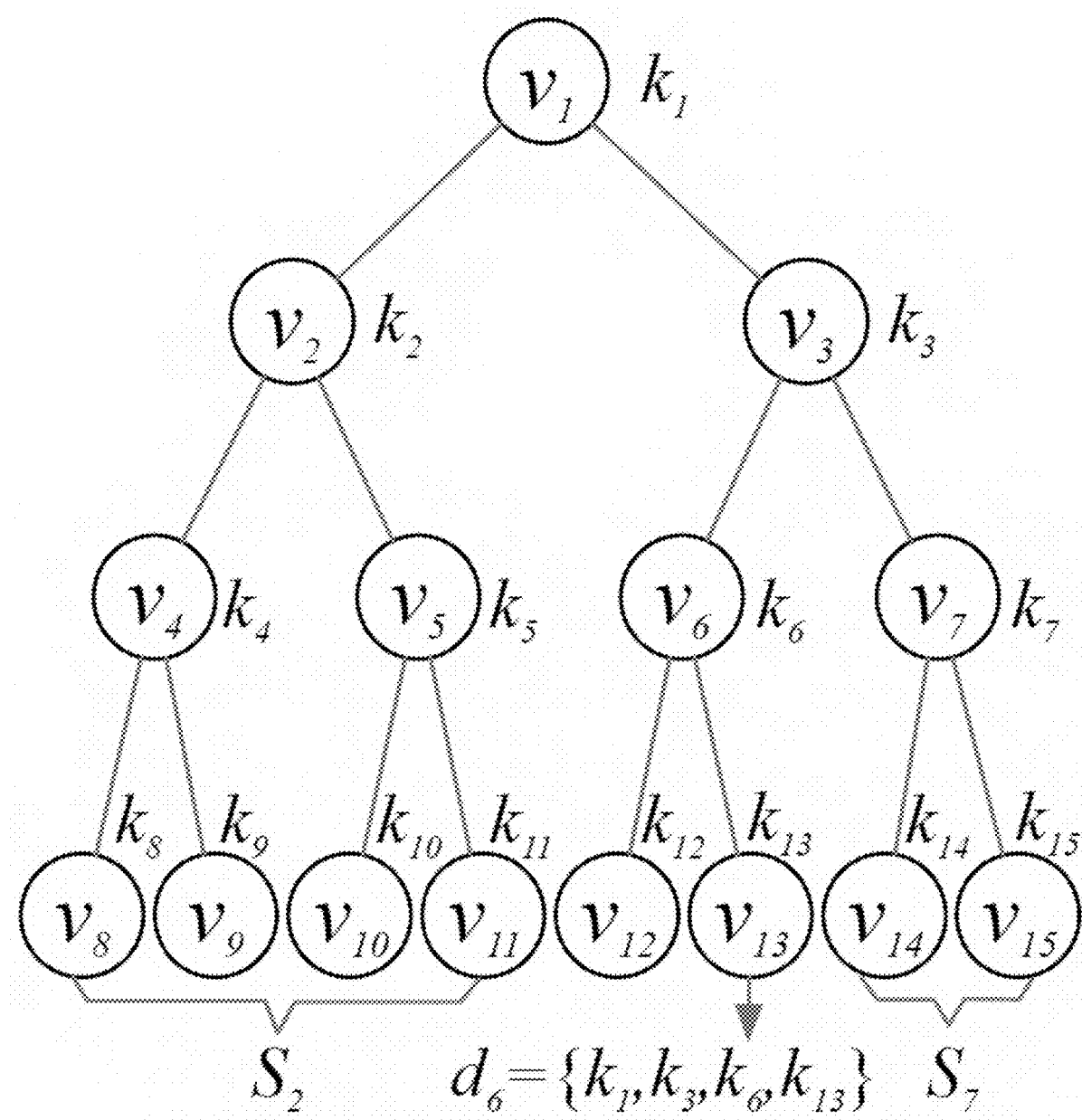
FIG. 17 is a chart which depicts a NNL broadcast encryption key setup according to one embodiment of the present invention.

Referring generally to FIG. 17, in some embodiments, the systems and methods utilize broadcast encryption. In some embodiments, the broadcast encryption is Naor-Naor-Lotspiech (NNL) broadcast encryption. In some embodiments, the complete subtree broadcast encryption by NNL as implemented in the systems and methods is efficient when the number of revoked recipients is small relative to the total number of potential recipients. For the purpose of example, let the number of all potential recipients be N. A full binary tree with N leaves corresponding to N recipients. Let N denote all these leaves. Let $v_i$ be a node in the tree. Let $S_i$ be the subtree set of all leaves in the subtree of $v_i$. As a result, there are 2N−1 nodes and 2N−1 complete subtrees. In NNL, the broadcaster assigns a random key $k_i$ to every node $v_i$ in the tree. Each recipient/leaf stores all log N+1 keys along the path to the root. For instance, if $N=2^{32}$, each recipient stores 33 keys.

In NNL, for a given set R of revoked receivers, $u_1, \ldots, u_r$ are the leaves corresponding to the elements of R. ST(R) is the directed Steiner Tree induced by the set R of vertices and the root, i.e., the minimal subtree of the full binary tree connecting all leaves in R. $Si_1, \ldots, Si_n$ is all the subtrees whose roots $v_1, \ldots, v_m$ are adjacent to nodes of outdegree 1 in ST(R), but they are not in ST(R). E is a blockcipher and F is symmetric encryption secure against IND-CPA attacks.

In some embodiments, to broadcast M to N\R, the broadcaster randomly selects a key K and sends $(i_1, \ldots, i_m, Ek_{i1}(K), \ldots, Ek_{im}(K), F_K(M))$. Each non-revoked user first decrypts the ciphertext corresponding to its subtree to obtain K and then M. In some embodiments, the length of the ciphertext is r log N/r, the number of keys stored at a recipient is log N, and the number of decryptions for a receiver is O(1).

In some embodiments, the systems and methods extend the NNL key distribution performed by a trusted dealer to achieve distributed key distribution. In some embodiments, the systems and methods extend NNL to support an unbounded number of recipients.

In some embodiments, the present invention may provide systems and methods for securely generating keys for threshold cryptography. In some embodiments, there are a multitude of options for generating keys. One such option is to utilize a trusted dealer to set up the keys for these schemes. The trusted dealer is only needed in a setup phase, after which there is no single point of failure. Another approach is to utilize distributed key generation protocols to generate the keys in a distributed manner. Yet another approach is one that requires trustees to meet in person to securely generate keys for regular public-key encryption schemes. In some embodiments, this is extended for threshold cryptography. In some embodiments, a number of trustees are selected to meet physically, either selected specifically or at random. In some embodiments, items brought to such a meeting may include a brand-new laptop and a multitude of brand-new USB sticks. The hard disk drive of the laptop is removed and the wireless network card disabled. The laptop is booted utilizing a standard Linux CD and the regular key generation code will be loaded on the machines through the USB stick. Keys will then be generated in the laptop and secret keys will be placed on individual folders. During the meeting, each trustee can use a USB stick to obtain their key and only their key. All trustees monitor the process. The laptop and the Linux CD are then destroyed after all trustees obtain their individual secret keys.

In some embodiments, systems and methods of controlled access are provided. In some embodiments, the system consists of clients 310 and servers 320. In some embodiments, the servers 320 are recited as brokers and/or replicas, and these terms are interchangeable. In some embodiments, the system incorporates BFT protocols, where f out of n replicas may fail arbitrarily (Byzantine failures) and a computationally bounded adversary can coordinate faulty replicas. In some embodiments, a replica delivers transactions, each submitted by some client 310. In some embodiments, the client 310 computes a final response to its submitted transaction from the responses it receives from replicas.

In some embodiments, the number of servers 320 is n, and f out of n servers 320 may fail arbitrarily (Byzantine failures). In some embodiments, all nodes know the identities of each other, and messages are authenticated. In some embodiments, the authentication uses digital signatures or message authentication codes. In some embodiments, the systems and methods incorporate (f+1, n) vector-label-input threshold encryption (TGen, TEnc, ShareDec, Vrf, Comb) so a public key pk and verification keys vk are associated with the system, while a secret key is shared among all servers 320, with a server i having a key sk, for i∈[1, n].

Figure 5:
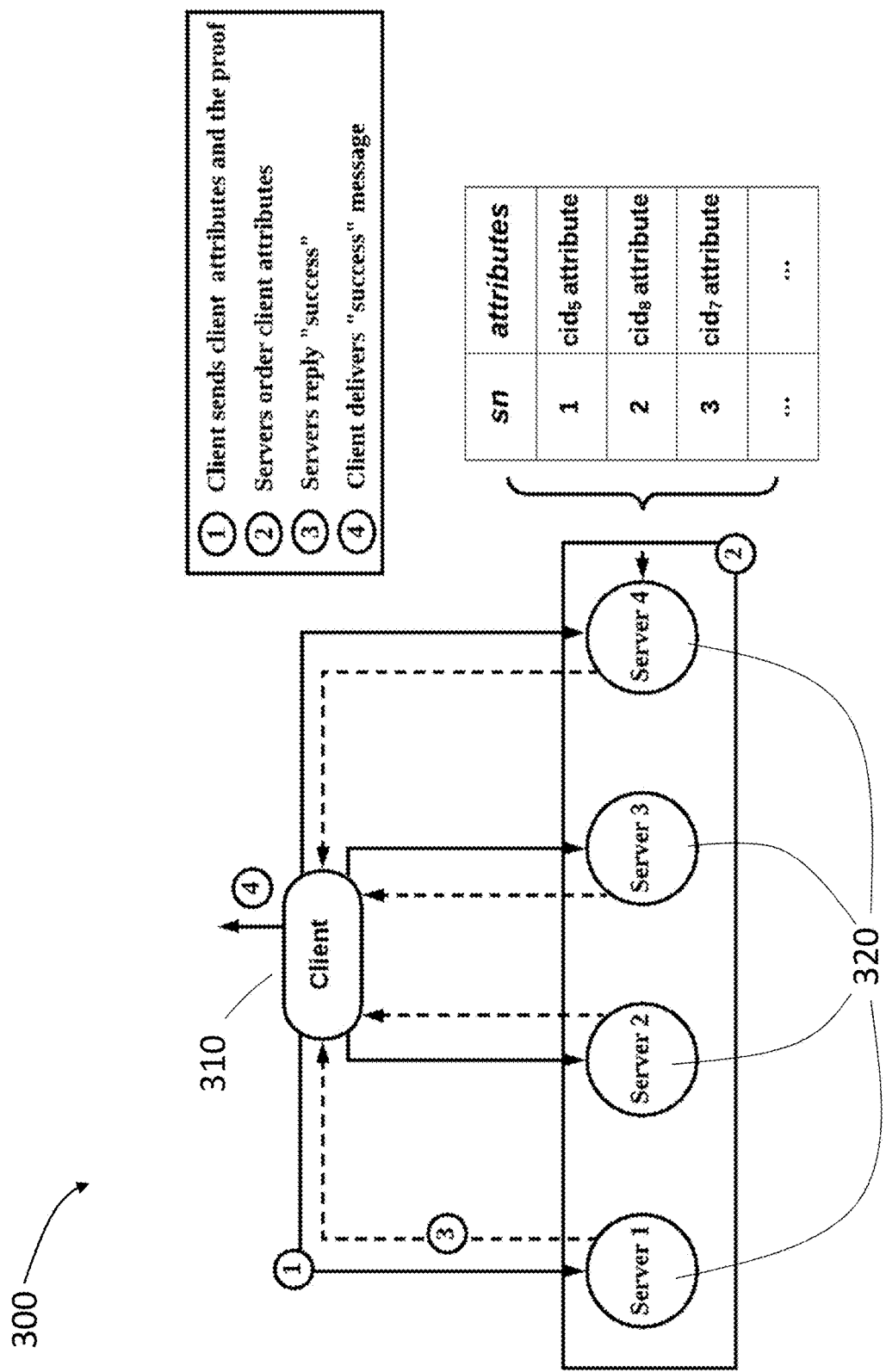
FIG. 5 is a flowchart depicting a "registration" routine, according to one embodiment of the present invention.

Referring to FIG. 5, in some embodiments, the systems and methods incorporate a registration routine. In some embodiments, clients 310 register with servers 320 with their attributes. Clients 310 authenticate themselves with the servers 320. During the registration, the systems collectively verify and store clients' attributes, shown in FIG. 5 as cid. Servers 320 runs BFT to ensure the registration information is consistent among servers 320.

In some embodiments, a client 310 sends (broadcasts) its attributes and the corresponding proof to servers 320 as a special registration transaction. In some embodiments, one or more server 320 verifies the correctness of the client attributes. In some embodiments, servers 320 run the underlying BFT protocol to assign a sequence number to the registration transaction and store the transaction in sequence number order. In some embodiments, servers 320 will discard the transaction if the verification fails. In some embodiments, the verification of the client attributes is done offline, in person, or online. An example of such offline verification is given: a client shows an ID card to prove he or she is above 25 years old. In some embodiments, one or more server 320 send replies signaling the success of registration. In some embodiments, upon receiving a calculable number of matching replies, the client 310 completes the registration. In some embodiments, the calculable number of replies is f+1.

Figure 6:
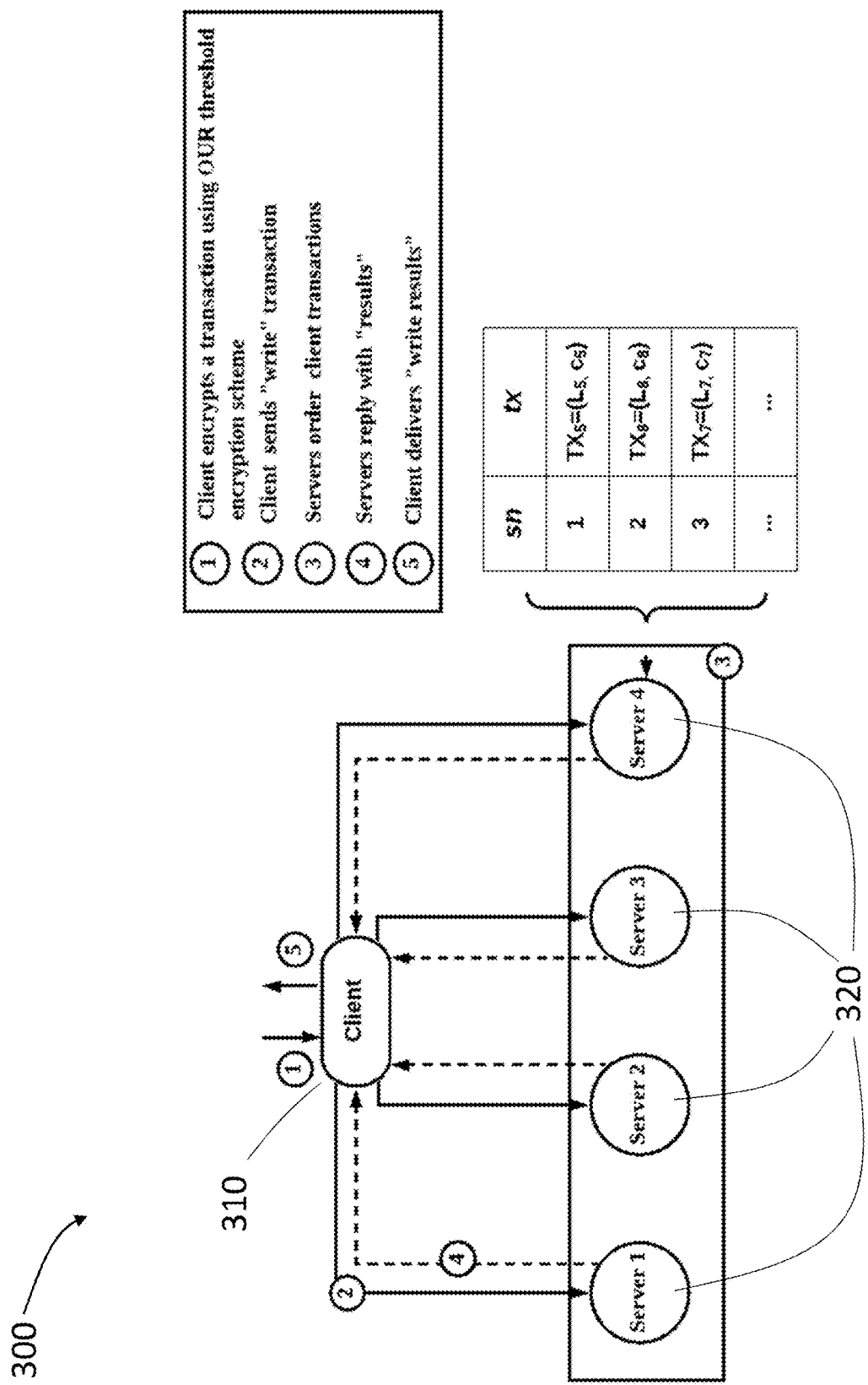
FIG. 6 is a flowchart depicting a "write" routine, according to one embodiment of the present invention.

Referring to FIG. 6, in some embodiments, the systems and methods include a write routine. In some embodiments, a client 310 takes one or more inputs and generates a ciphertext. In some embodiments, the one or more inputs is a label. In some embodiments, the label is a vector label, examples of which is given in FIG. 4. In some embodiments, the vectors are of variable length. In some embodiments, the client 310 sends the ciphertext as a transaction to one or more server 320. In some embodiments, the transaction includes a label. In some embodiments, the transaction is a write transaction. In some embodiments, the servers 320 receive the transaction. In some embodiments, upon receiving the transaction, the server 320 orders the transaction. In some embodiments, the ordering is done by assigning a sequence number to the transaction, as is shown in the chart in FIG. 6 with the column header sn. In some embodiments, the server 320 stores the transaction. In some embodiments, after storing a transaction, the server 320 performs an operation associated with the transaction. In some embodiments, the servers 320 then send replies to the transaction to the client 310. In some embodiments, the client 310 receives one or more replies and ends the write routine.

In some embodiments, the following structure and syntax is contemplated. Let ts, op, o, hr=[$hr_1$ ... $hr_s$], ac=[$ac_1$ ... $ac_z$] and p be the timestamp, the operation type, the executable operation o, the header, the access control policies, and the payload of a transaction, respectively. The header hr consists of the attributes of a transaction and optionally additional associated-data that do not need to be privacy-protected.

A client cid takes as input ts, op, o, hr, p, and access control rules ac, and computes a threshold encryption ciphertext as follows. The vector of labels L for the client is of the form (cid, ts, op, hr, ac). The client cid takes as input the threshold encryption public key pk, L, and p, and outputs a labeled ciphertext (L, c)←TEnc(pk, p, L) using vector-label-input threshold encryption. The client sends (broadcasts) (L, c) as write transaction to be executed by servers.

Upon receiving a client transaction, one or more servers 320 run a BFT protocol to order the transaction by assigning a sequence number to the transaction, store the transaction, and execute the associated operation o in sequence number order. The one or more servers 320 send replies to the write requests which, in some embodiments, contain executed client request. Upon receiving f+1 matching replies, the client 310 completes the write operation.

Figure 7:
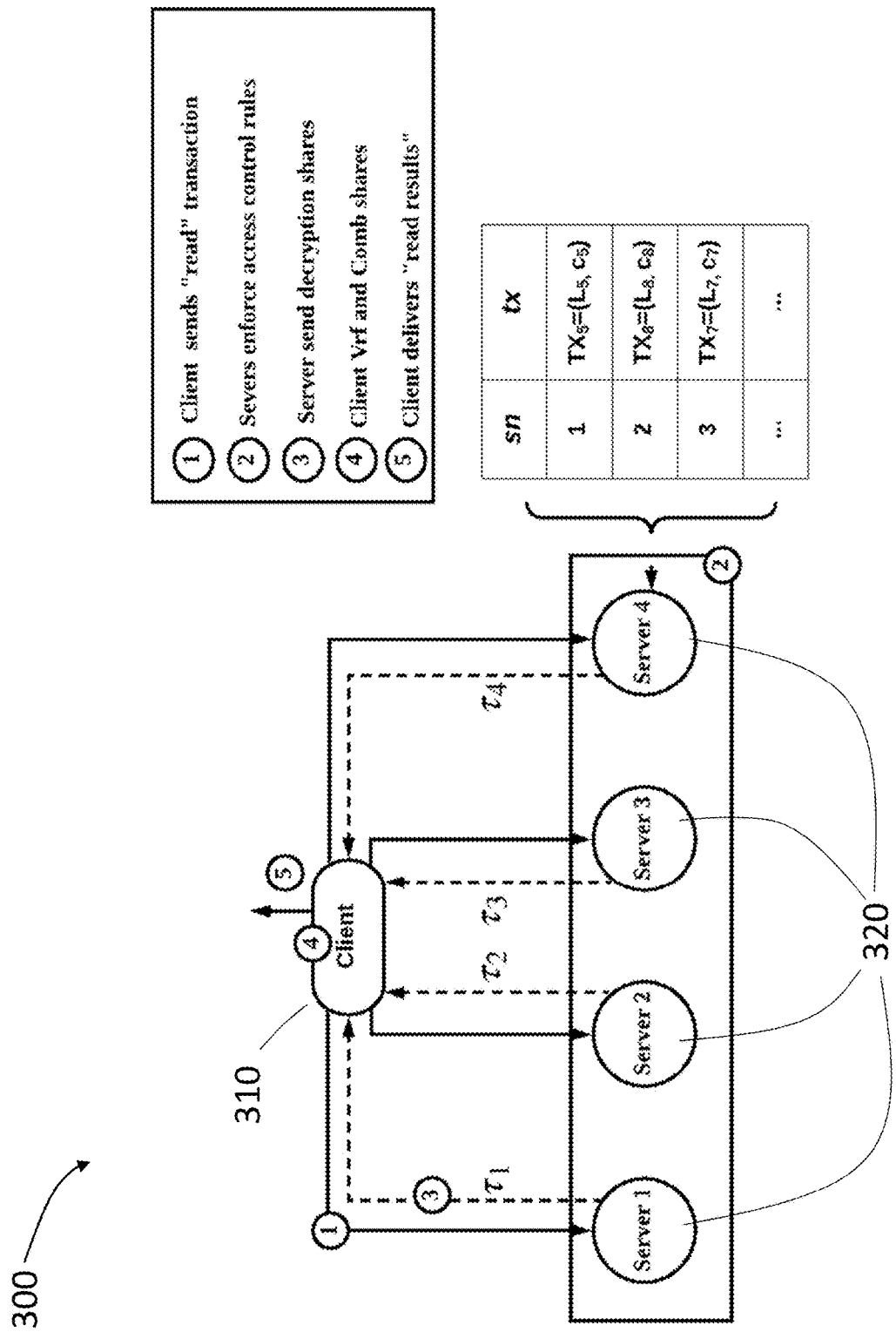
FIG. 7 is a flowchart depicting a "read" routine, according to one embodiment of the present invention.

Referring to FIG. 7, in some embodiments, the systems and methods contemplate a read routine. In some embodiments, a client 310 begins the read routine. In some embodiments, the client 310 sends a read request for a transaction associated with the system. In some embodiments, the client 310 sends read request for multiple transactions associated with the system. In some embodiments, one or more server 320 receives the transaction. In some embodiments, the server 320 decides if the client 310 is authorized to receive the transaction. In some embodiments, the server 320 decides this by checking access control policies associated with the transaction. In some embodiments, where the server 320 determines the client 310 is allowed to access the transaction, each one or more server 320 sends its decryption share to the client 310. Upon receiving a calculable number of matching transactions with valid decryption shares, the client 310 obtains the transaction in plaintext. In some embodiments, the client 310 runs a combination algorithm to obtain the transaction in plaintext. In some embodiments, read transactions are ordered. In some embodiments, read transactions are not ordered, as they do not change system state.

In some embodiments, a client sends a read request for a particular transaction TX of the form (L, c). Upon receiving a read transaction, one or more servers decide if the client is authorized by checking access control policies associated with the transaction TX. If the client is allowed to have access to TX, each server $i \in [1 \ldots n]$ sends these clients its decryption share $\tau_i \leftarrow \text{ShareDec}_{ski}$ (L, c) and the sequence number sn assigned to the labeled ciphertext (L, c). Upon receiving f+1 matching transactions with valid decryption shares from the servers with the same sequence number sn, each client runs Comb to obtain the transaction in plaintext. A decryption share $\tau$ is valid if Vrf(vk, $\tau$, c, L)=1.

The following is provided as an example of such systems and methods. Access control is general and is either role-based or attribute-based. For example, the exchange of health records. In a scenario where a client sends a patient record, he or she may specify two attributes ("Emergency", "Heart attack") and four access control rules ("DC area doctors", "15-year practice", "cardiology", and "no malpractice history"). In addition, the servers may already contain certain rules, and some clients may send subscriptions to indicate they accept "Emergency" cases and they can deal with "Heart attacks." After determining who the authorized clients are, the servers will send them the decryption shares, which will be delivered and combined at the client side.

In some embodiments, the systems and methods contemplate a publish/subscribe, or pub/sub, configurability. In some embodiments, subscribers complete a registration routine as shown in FIG. 5. In some embodiments, subscribers provide one or more subscriber attributes during registration. In some embodiments, subscribers, which may be a subset of clients 310, provide one or more subscriber interest during registration. In some embodiments, publishers, which may be a subset of clients 310, complete a registration routine as shown in FIG. 5. In some embodiments, publishers provide one or more attributes during registration. In some embodiments, one or more servers store one or more attributes and/or interests associated with subscribers and/or publishers. In some embodiments, the attributes and/or interests are ordered by one or more servers.

Figure 8:
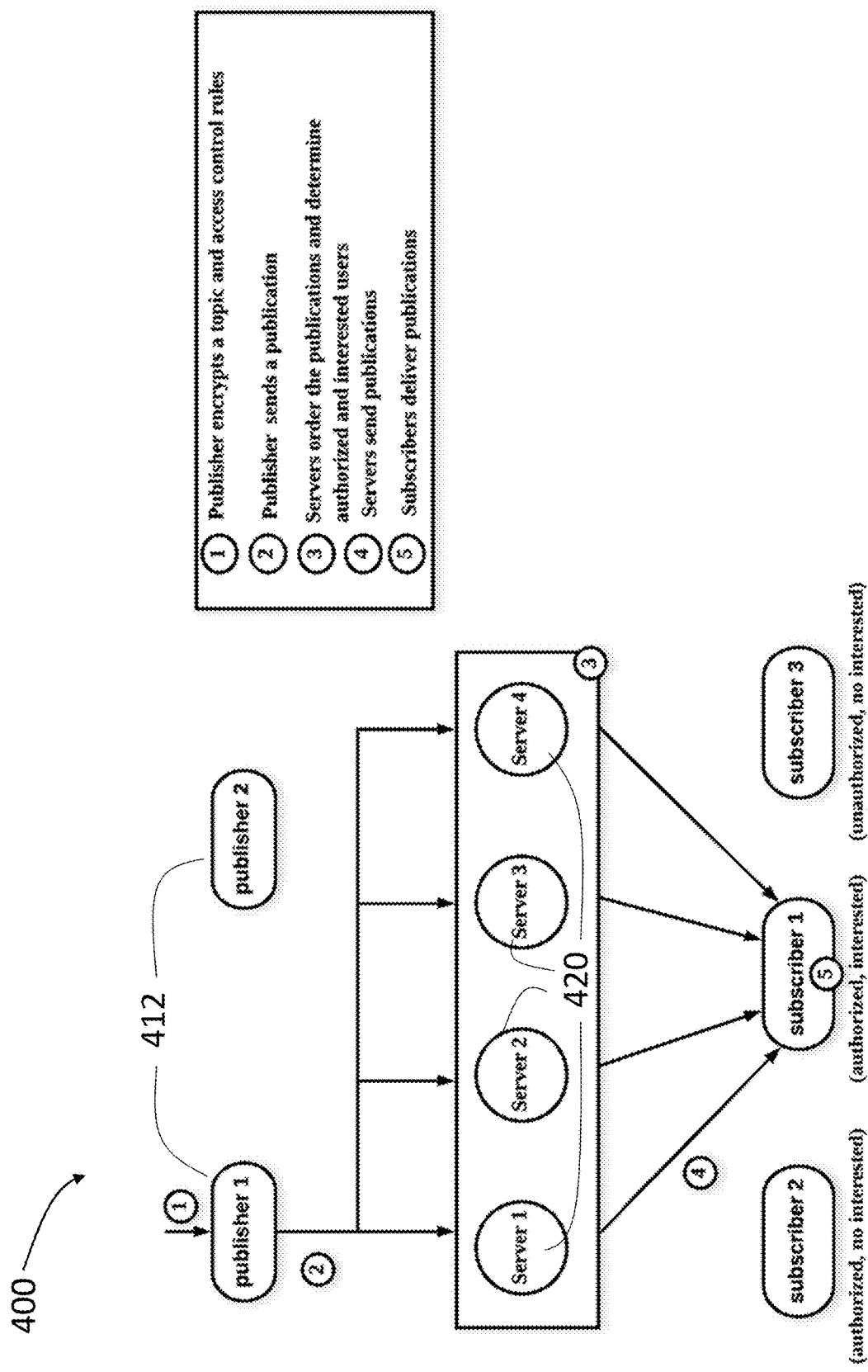
FIG. 8 is a flowchart depicting the basic structure and steps of a "pub/sub" system according to one embodiment of the present invention.
Figure 9:
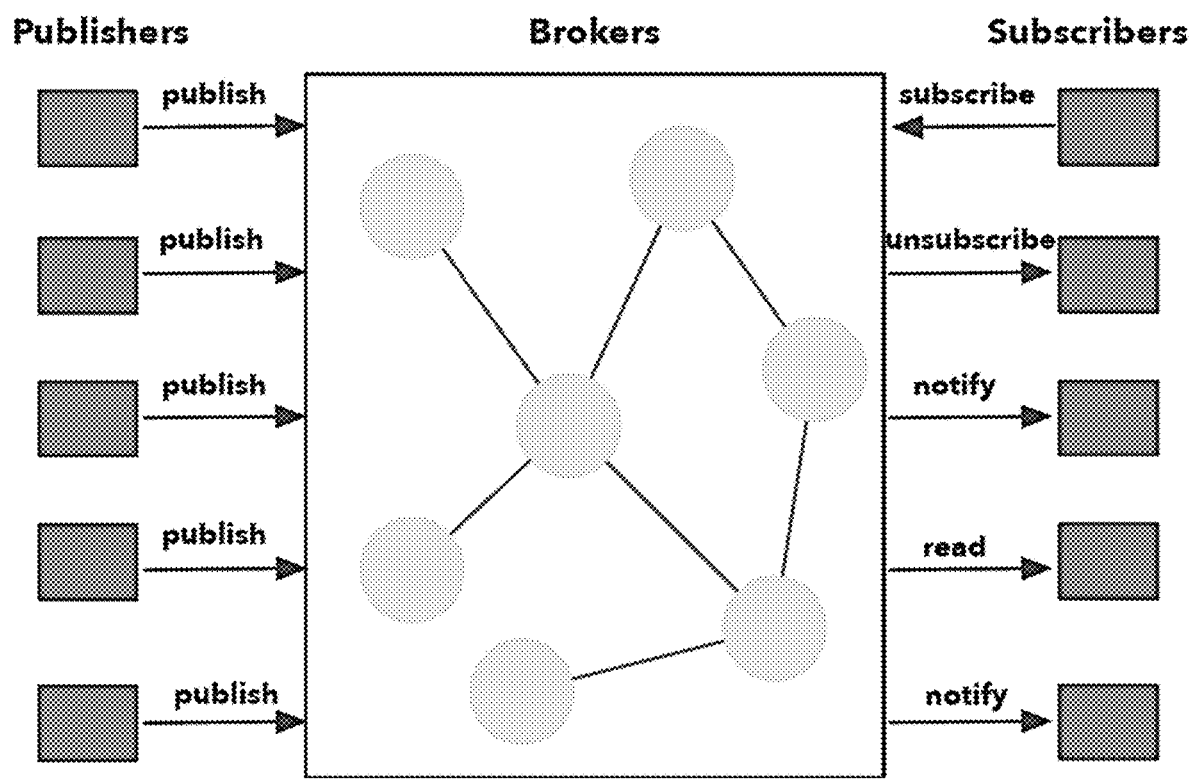
FIG. 9 is a flowchart depicting the basic structure and steps of a "pub/sub" system according to another embodiment of the present invention.

Referring generally to the structure and associations of FIG. 8, in some embodiments, publishers 412 conduct an advertisement routine. In some embodiments, publishers 412 advertise to the server 420 publications, said publications associated with one or more attributes. In some embodiments, the publications have no attributes. In some embodiments, publishers 412 encrypt the publications, which are subsequently sent to the servers 420. In some embodiments, the servers 420 then verify which subscribers 414 are both interested and approved to receive the publications. In some embodiments, the servers 420 then send the encrypted publication and a decryption share to the approved subscriber 414. In some embodiments, once the subscriber 414 receives a calculable amount of valid responses from one or more server 420, the subscriber is enabled to decrypt the publication and access the publication in plaintext. Such a threshold calculable amount of valid responses is depicted in FIG. 2.

The systems and methods are configured to incorporate the decoupling feature of pub/sub system, wherein publishers 412 and subscribers 414 communication is decoupled both in time and space. Publishers 412 and subscribers 414 do not need to know or synchronize with one another. In some embodiments, they never need to communicate with each other, and indeed, communication directly between end-customers may not always be possible. The decoupling feature enables flexible and scalable information exchange, and also avoids implementation and maintenance difficulties for non-expert end-customers.

In some embodiments, both publishers 412 and subscribers 414 register with the system brokers. In some embodiments, this is done physically. In some embodiments, this is done via an online portal where publishers 412 need to authenticate themselves with the help of external infrastructure such as PKI. During the registration, the brokers collectively verify the end-users attributes and record the attributes in all relevant brokers. In some embodiments, the systems and methods are configured to run a BFT protocol to ensure a consistent state among the brokers.

In some embodiments, publications are sorted by publication types (e.g., radiology, emergency vs. non-emergency in healthcare), and require a certain set of brokers only deal with certain publication types. In some embodiments, the systems and methods contemplate a secure way of selecting the set of brokers associated according to publication types.

Figure 10:
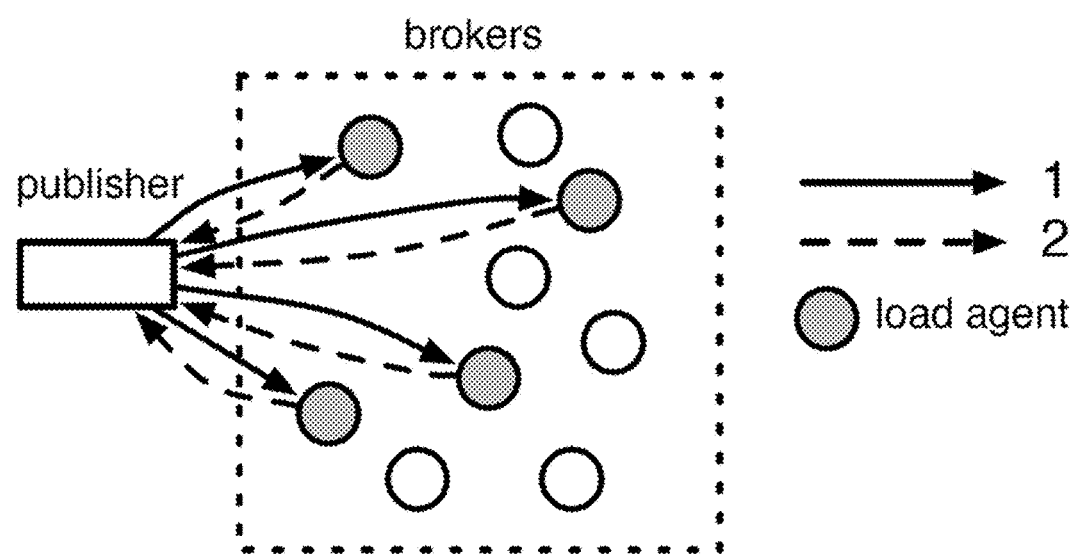
FIG. 10 is a flowchart depicting load agent configuration according to one embodiment of the present invention.
Figure 11:
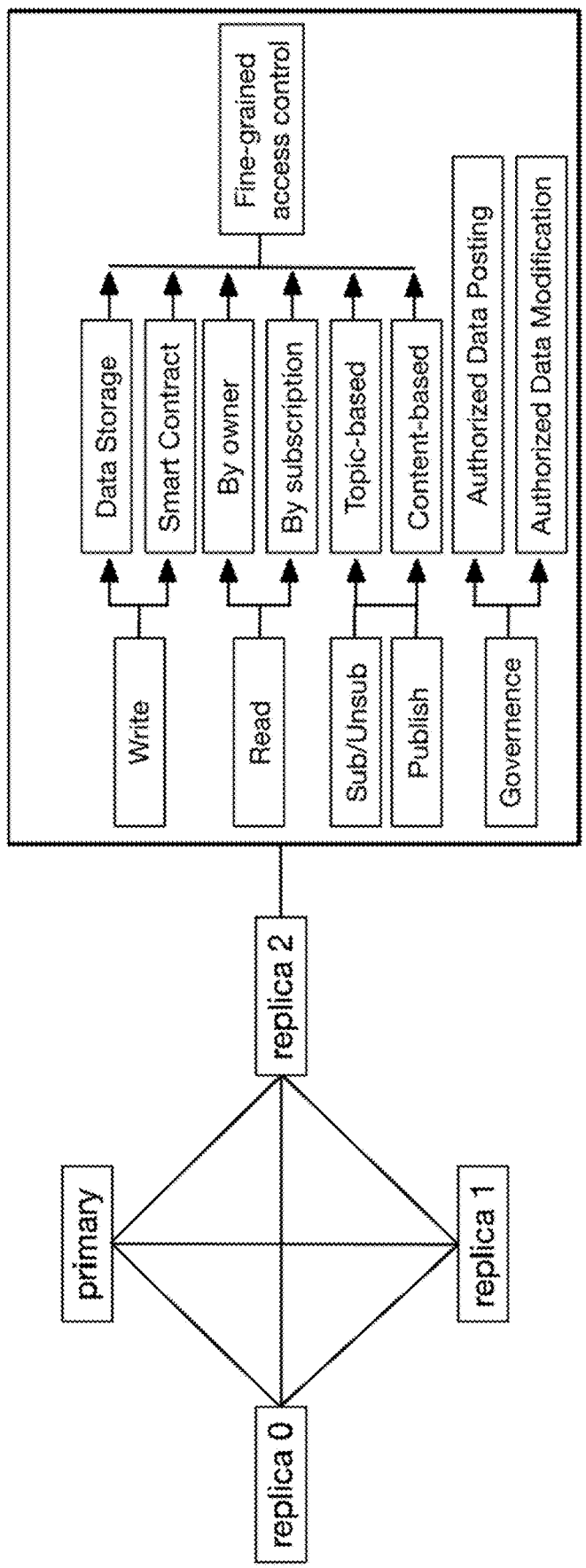
FIG. 11 is a flowchart depicting a consensus hierarchy according to one embodiment of the present invention.

Referring generally to FIG. 10, in some embodiments, a method of selecting brokers for BFT replication for load balancing and defending against denial-of-service attacks is to apply a public hash function to "publication type" to get a random set of brokers for the publication type. The approach works well if there are an exponential number of brokers. In some embodiments, however, the number of brokers is limited and the input to the public hash function (i.e., publications) can be adversarially chosen by the adversary. In this way, the brokers may be chosen in an unfair manner, leaving the possibility of unbalanced loads and denial-of-service (DOS) attacks.

The systems and methods are configured to select a number of load agents to distributively help choose the set of brokers according to publications types. In some embodiments, any interested party is enabled to contact load agents to get the information regarding which set of brokers are responsible for all publications with the publication type. Specifically, for a publication type T, load agents jointly generate a distributed PRF value. It will be appreciated that the threshold PRF value is indeed a deterministic value of the underlying function F. No matter which asks for the broker set selection, for certain publication type T, the set of brokers is always fixed and cannot be manipulated by the adversary. In some embodiments, the value is precomputed and put in a reliable bulletin board. A reliable bulletin board is easily implemented by a BFT protocol.

Referring generally to FIG. 8, in some embodiments, the publishers 412 advertise to the system their publications types. The brokers broadcast the publications to all subscribers 414, which then express their interests via subscriptions. The subscriptions are recorded at relevant brokers.

In some embodiments, the systems and methods are configured to incorporate threshold encryption. In some embodiments, N subscribers 414 are interested in some publications from some publisher 412. A publisher 412 generates broadcast encryption keys for N subscribers 414 accordingly. In some embodiments, each publisher 412 uses threshold encryption to encrypt the keys for N subscribers 414. The resulting ciphertexts are sent to the brokers which will send decryption shares to corresponding subscribers 414. It will be appreciated that under this setup, the subscribers 414 know the broadcast encryption keys, but unless an adversary can corrupt more than f out of n brokers, it does not know keys or the encrypted contents. Accordingly, unless more than f out of n brokers collude, brokers cannot access encrypted information.

In some embodiments, each publisher 412 uses broadcast encryption to encrypt the publications. In some embodiments, the resulting ciphertexts together with metadata information are then sent to the brokers. It will be appreciated that the system leverages BFT protocol to maintain a consistent state among the brokers. In some embodiments, the brokers treat the ciphertexts and metadata as the client requests and assign a sequence number to the requests. The subscribers 414 maintain a log of received publications and deliver the notifications according the total order assigned by the BFT protocol. Specifically, each subscriber 414, when receiving f+1 matching replies from the brokers with a sequence number sq, stores the publications in its buffer. Each subscriber 414 delivers the publications in sequence number order, which in some embodiments is total order as determined by the broker.

In some embodiments, the systems and methods include a novel security notion for broadcast encryption, the soundness notion. In some embodiments, such soundness notion is required even if a malicious broadcaster would be able to generate a ciphertext that could be decryptable into different plaintexts with different recipients.

In some embodiments, the systems are configurable to utilize broadcast encryption to revoke subscribers once they do not want to be updated or they are not authorized to receive publications. Additionally, in some embodiments, the system utilizes a traitor tracing scheme, which operates as an extension of conventional broadcast encryption to trace the parties who leak keys.

Those ordinarily skilled in the art would appreciated that using broadcast encryption leads to three major benefits: being computationally more efficient, and supporting dynamic membership.

It is well known that there exist two open problems in distributed systems: privacy-preserving and decentralized pub/sub and publication total order even with multiple topics and access control. The system solves the two problems and is therefore an improvement upon existing technology.

Some embodiments of the systems and methods described herein ensure confidentiality for publication payload, but not for headers of publications or constraints of subscriptions. The terms attributes and topics are used interchangeably.

In some embodiments, the number of servers 420 is n, and f out of n servers 420 may fail arbitrarily (Byzantine failures). In some embodiments, all nodes know the identities of each other, and messages are authenticated. In some embodiments, the authentication uses digital signatures or message authentication codes. In some embodiments, the systems and methods incorporate (f+1, n) vector-label-input threshold encryption (TGen, TEnc, ShareDec, Vrf, Comb) so a public key pk and verification keys vk are associated with the system, while a secret key is shared among all servers 420, with a server 420 i having a key sk, for i ∈ [1 . . . n].

The systems and methods are configured to incorporate the decoupling feature of pub/sub system, wherein publishers 412 and subscribers 414 communication is decoupled both in time and space. Publishers 412 and subscribers 414 do not need to know or synchronize with one another. In some embodiments, publishers 412 and subscribers 414 authenticate themselves with the help of PKI. During the registration, the brokers collectively verify and store users' attributes. The system runs BFT to ensure the registration information is consistent among brokers.

In some embodiments, the publishers 412 advertise to the system their publication types, and the brokers broadcast the publication types to all potential subscribers 414 who show an intent to receive subscriptions during the registration process or later via subscriptions. Then subscribers 414 submit their subscriptions which are stored at the brokers. Advertisements and subscriptions are treated as conventional blockchain operations that need to be ordered.

In some embodiments, the following structure and syntax is contemplated. Let ts, op, o, hr=[$hr_1$ . . . $hr_s$], ac=[$ac_1$ . . . $ac_t$] and p be the timestamp, the operation type, the executable operation o, the header, the access control policies, and the payload of a transaction, respectively. The header hr consists of the attributes of a transaction and optionally additional associated-data that do not need to be privacy-protected.

Figure 3:
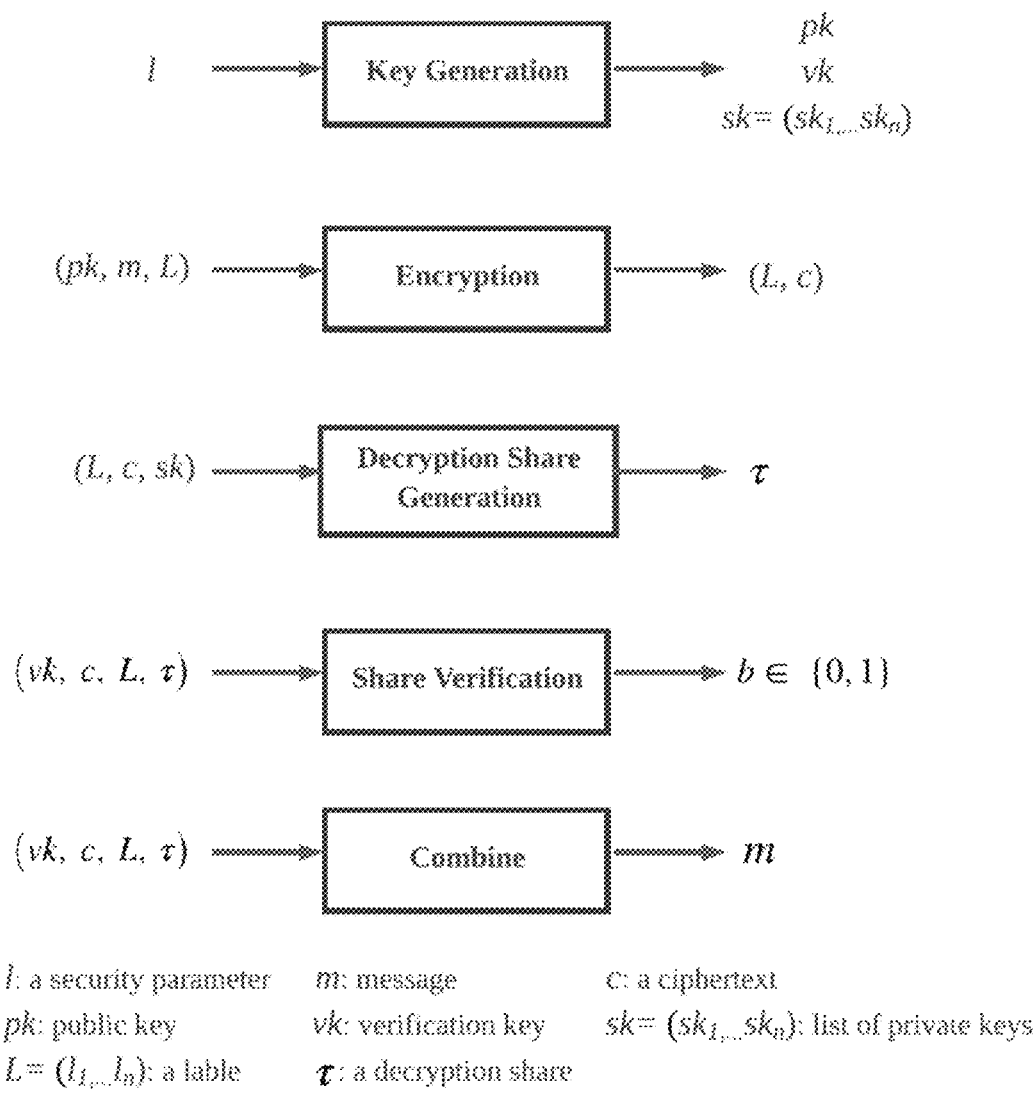
FIG. 3 is a diagram of several flow charts demonstrating various steps included in an encryption scheme according to one embodiment of the present invention.

Referring generally to FIG. 3, in some embodiments, a publisher cid takes as input ts, op, o, hr, p, and access control rules ac, and computes a threshold encryption ciphertext as follows. The vector of labels L for the publisher is of the form (cid, ts, op, hr, ac). The publisher cid takes as input the threshold encryption public key pk, L, and p, and outputs a labeled ciphertext (L, c)←TEnc(pk, p, L) using vector-label-input threshold encryption. The publisher sends (broadcasts) (L, c) as write transaction to be executed by servers.

In some embodiments, servers 420 order publications, enforce access control, and send publications to authorized and interested subscribers 414. In some embodiments, servers 420 runs BFT to order publications as transactions. Specifically, servers 420 will assign a sequence number sn to a publication. The servers 420 will store (L, c). For each attribute, the server 420 will additionally maintain an incremental sequence number pn, i.e., the server 420 will store a sequence number in the format of sn-pn for each transaction.

Figures 12, 13:
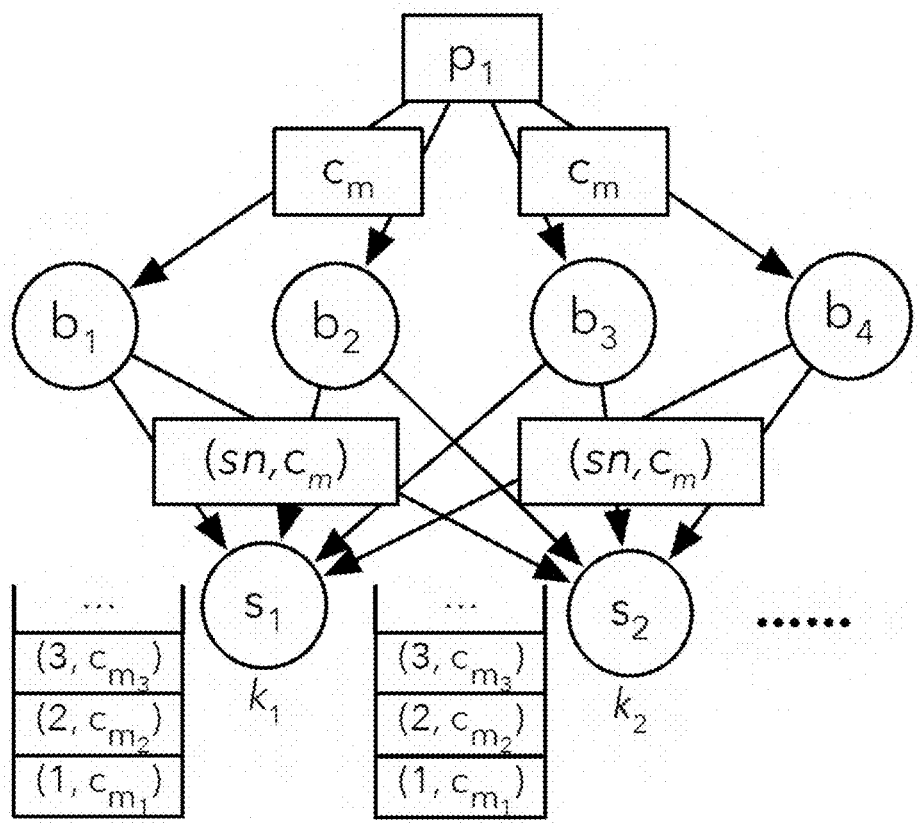
FIG. 12 is an example of data blocks and publications order indices, according to one embodiment of the present invention.
FIG. 13 is a flowchart showing a key distribution process according to one embodiment of the present invention.

In some embodiments, the systems and methods maintain sn-pn. As illustrated in FIG. 12, two tables are generated and maintained by the system. In some embodiments, a first table is a table for data blocks. In some embodiments, a second table is a table for publication order indices. The data block table maintains all transactions in the system, which are stored in the database. The publication order index table contains metadata of the data blocks and is derived from the data block table. The index table is stored either in the database or in memory.

In some embodiments, for each transaction, the sequence number (sn), the client id (cid), the operation type (op), the message payload (p), timestamp (ts), access control rules (ac), and the publication attributes (attributes) are all stored. The aforementioned fields in the data blocks are configurable to be empty, or NULL.

In some embodiments, the publication order index table is configured to achieve attribute-based total order (i.e., total order for the publications according to the attributes). Specifically, for each attribute, the system maintains a simple data structure S-PS, where the S field consists of the sequence numbers of transactions (the same sequence numbers as in the data blocks table), and the PS field consists of the per-attribute sequence numbers. The PS field contains incremental sequence numbers for a specific attribute, ensuring there is no gap in the sequence numbers for transactions with the same attribute. For example, as shown in FIG. 12, in the data block table, transactions with sequence number 0 and 2 are publications. There are two attributes involved in the data block table: price="105" and county="orange". Correspondingly, there are two attributes in the publication index table. As both publications have the attribute (price="105"), the attribute in the index table with has two S-PS numbers: 0-0 and 2-1. The numbers 0 and 2 in the S field are the sequence numbers in the data block table, while the numbers 0 and 1 in the PS field are per-attribute sequence numbers.

In some embodiments, the servers 420 decide the authorized subscribers 414 by 1) matching publication attributes with existing subscription constraints, 2) checking access control policies associated with the publication, and 3) checking global access control polices already installed in the brokers. For authorized subscribers 414, each server 420 $i \in [1 \ldots n]$ sends the sequence number sn-pn and its decryption share $\tau_i \leftarrow \text{ShareDecs}_{ki}$ (L, c). For unauthorized subscribers 414, each server 420 $I \in [1 \ldots n]$ sends them the sequence number sn-pn and a short distinguished symbol denoting an empty message payload (so that subscribers 414 safely skip the sequence numbers for a particular topic).

In some embodiments, subscribers 414 deliver the publications. In some embodiments, the subscribers 414 maintain logs of publications according to attributes. In some embodiments, upon receiving f+1 matching publications from different servers 420 with the same sequence number sn-pn, each subscriber 414 put them into its log. If the publication contains an empty payload, the subscriber 414 directly skips it and delivers publications with higher sequence number. Otherwise, each subscriber 414 obtains f+1 decryption shares and run Comb to obtain the publication in plaintext. A decryption share $\tau$ is valid if $\text{Vrf}(vk, \tau, c, L)=1$.

In some embodiments, the systems and methods utilize VLI threshold encryption to enable general access control. Where subscriptions and access control rules change frequently, the system is configurable such that attribute matching and access control are fully executed at the servers.

It will be appreciated that the systems and methods described herein provide a modular framework for confidentiality allowing trade-offs between functionality, security, and efficiency. The systems and methods are configurable to support various confidentiality modules. In some embodiments, the confidentiality module is an encryption-free module. In some embodiments, the confidentiality module is one utilizing threshold encryption. In some embodiments, the confidentiality module is one utilizing hybrid encryption. And yet in some other embodiments, the confidentiality module combines threshold encryption with broadcast encryption. For all these modules, the decoupling feature is preserved.

In some embodiments, the confidentiality module utilizes hybrid encryption. When subscriptions and access control rules do not change frequently, or simply are static, it is beneficial to use hybrid encryption. In hybrid encryption, clients use labeled threshold encryption to encrypt a random session key and put the ciphertext into the servers. According to subscriptions, access control rules, and server installed rules, the decryption shares of the ciphertext of the random session key will be sent to authorized subscribers. Later, the publications will be encrypted and decrypted using the session key. A fresh session key is established when subscriptions, access control rules, or even client attributes change.

In some embodiments, the confidentiality modules combine threshold encryption with broadcast encryption. In some embodiments, there are multiple phases. The process is divided into a key distribution phase and a content distribution phase. The key distribution process needs only to be done once, which contrasts with hybrid encryption. Such a confidentiality module is configurable for both generic broadcast encryption and NNL broadcast encryption.

Referring to FIG. 13, a publisher generates broadcast encryption keys for N subscribers. Each publisher uses vector-label-input threshold encryption to encrypt all keys for N subscribers, with the label L specifying access rules. Ciphertexts are stored at the brokers which will at some point send decryption shares to subscribers so that each subscriber combines a broadcast encryption key. The brokers fully control when broadcast encryption keys are distributed: either when the subscribers register themselves, express their interests, pay their fees, or when they meet the access control rules. In addition, brokers distribute the keys randomly (using threshold PRF) to subscribers (to maintain the decoupling property even when subscribers unsubscribe their interests). For NNL, a trivial approach is that the number of keys stored at a recipient is log N, so the total keys stored at the brokers would be N log N. In the systems and methods herein, the brokers only need to store O(N) keys. To achieve this, servers store the threshold encryption of all distant 2N−1 keys, and servers will distribute the keys according to the tree structure agreed beforehand.

Figure 14:
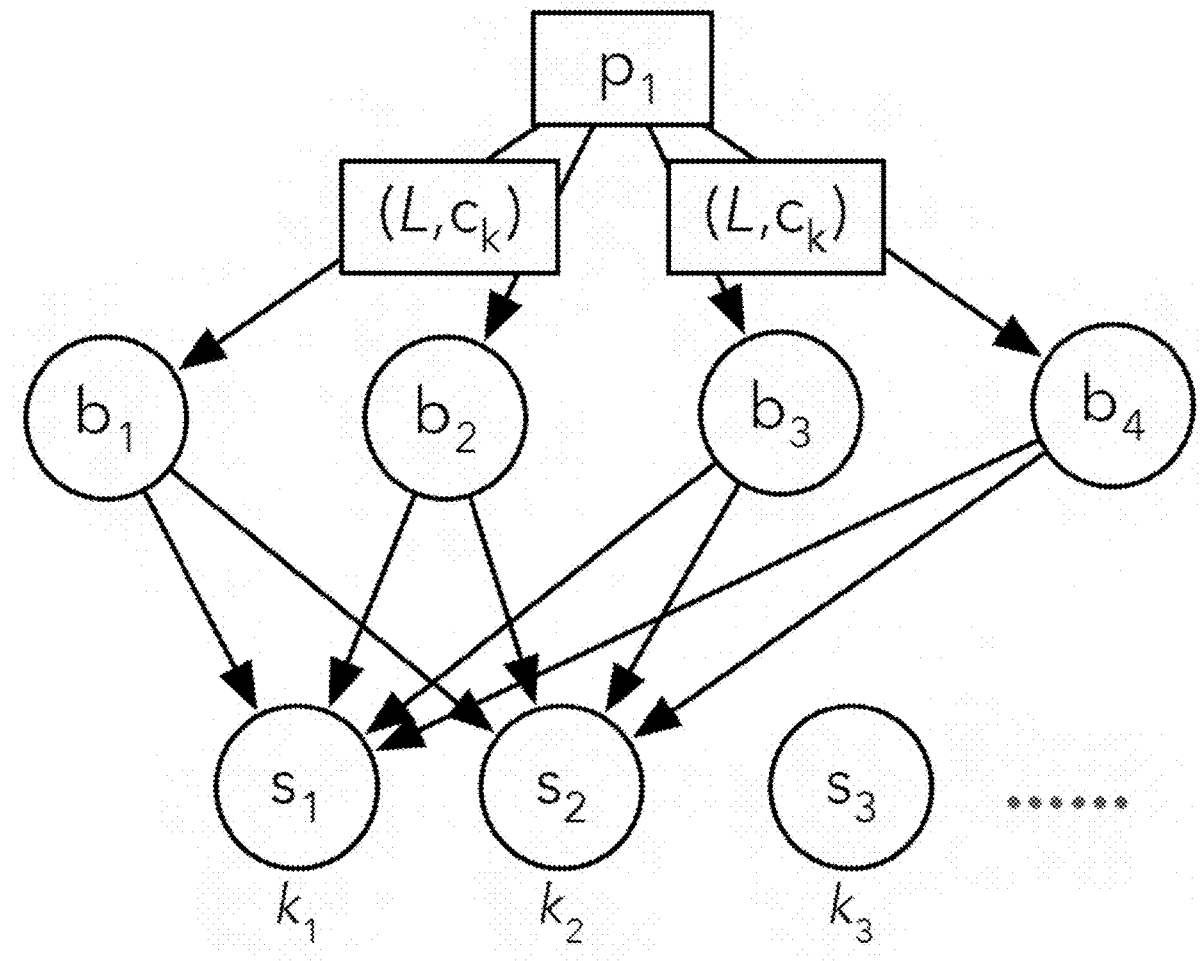
FIG. 14 is a flowchart showing a content distribution process according to one embodiment of the present invention.

Referring to FIG. 14, each publisher uses broadcast encryption to encrypt the publications. The ciphertexts will be sent to brokers who forward them to authorized subscribers. Brokers need to update publishers and let them know the indices of keys to be revoked, and publishers broadcast new ciphertexts accordingly. The systems and methods require brokers to distribute the keys randomly, as such indices do not correspond to real identities of subscribers and the publishers and subscribers remain decoupled and anonymous. For NNL, the number of recipients need not be bounded. When the initial tree does not suffice, publishers will generate a larger one doubling the original one so that the original one becomes its subtree.

Such a configuration leads to several benefits, such as being computationally more efficient and supporting dynamic membership without interaction.

Figure 18:
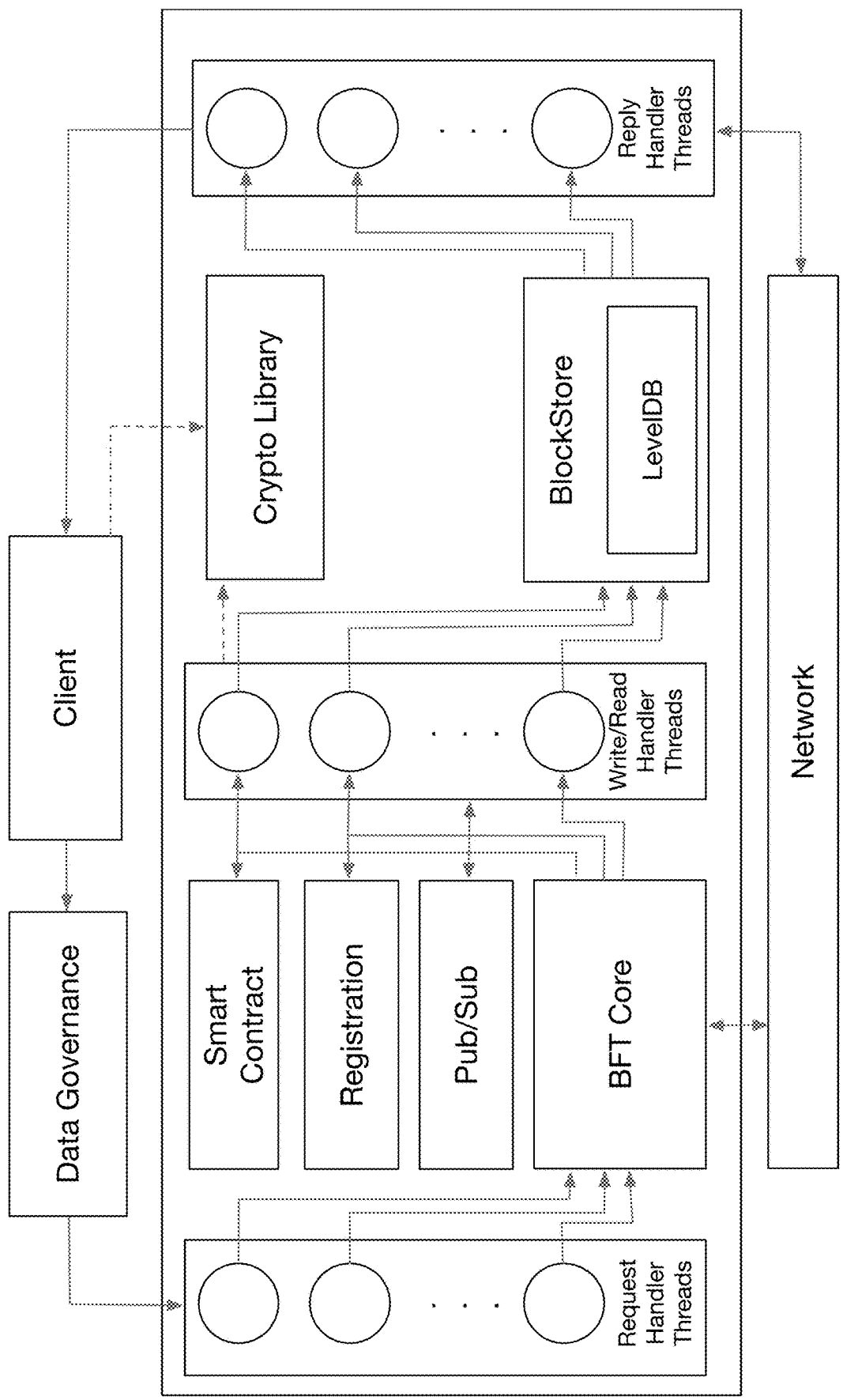
FIG. 18 is a flowchart depicting one architecture configuration of an implemented system according to one embodiment of the present invention.

Referring generally to FIG. 18, the systems and methods are configurable to support a variety of tunable parameters for all its modules. In some embodiments, these tunable parameters are described as BatchSize, BlockSize, and the number of threads used at various stages. First, the systems and methods use a batch-process, block-store approach, where transactions are batched, ordered, processed in parallel (when possible), and the results are stored in the database in blocks. BatchSize and BlockSize can be tuned according to the underlying hardware, workloads, and applications. Second, the systems and methods uses multithreading extensively at various stages and allows adjusting the number of threads used for each stage independently according to the underlying hard-ware and workload. In addition, for the threshold encryption module, a user chooses to decrypt the threshold encryption ciphertexts when they are written to the system or when they are read. This flexibility allows the systems and methods to provide further trade-offs between read and write performance.

The systems and methods described herein configurably supports two data governance approaches to defending against data pollution and illegal content distribution, which is a known pain point in the art. Both approaches introduce several agents who will check client requests before they are sent to the servers.

As an example of this concept, n is the number of servers and M is the number of agents. A (t, M) threshold signature is established (TGen, TSig, Vrf Comb, SV) so that a public key pk and verification keys vk are associated with the system, while a secret key is shared among all servers, with server i having a secret key sk, for i∈[1 . . . n]. The client request message m includes the user identity and an incremental sequence number. Let buf be the request queue of the servers to be ordered by the BFT process.

In some embodiments, the protocol is configurable to work in completely asynchronous environments where no timing assumption is needed. Upon input m, a client broadcasts (invoc, m) to agents for approval. Upon receiving (invoc, m, σ), an agent determines if to approve or deny the request. If approved, the agent uses TSig to obtain a partial signature $σ_j$ and sends (approve, m, $σ_j$). Upon receiving t valid threshold signature shares of the form (approve, m, $σ_i$) for some m and some i∈[1 . . . M], the client then runs the Comb algorithm to obtain a threshold signature σ on m. The client then broadcasts (req, m, σ). Upon receiving (req, m, σ), the server checks if SV(vk, pk, m, σ)=1 and returns buf=buf∪{m}. If the check fails, the server discards the request.

Figure 15:
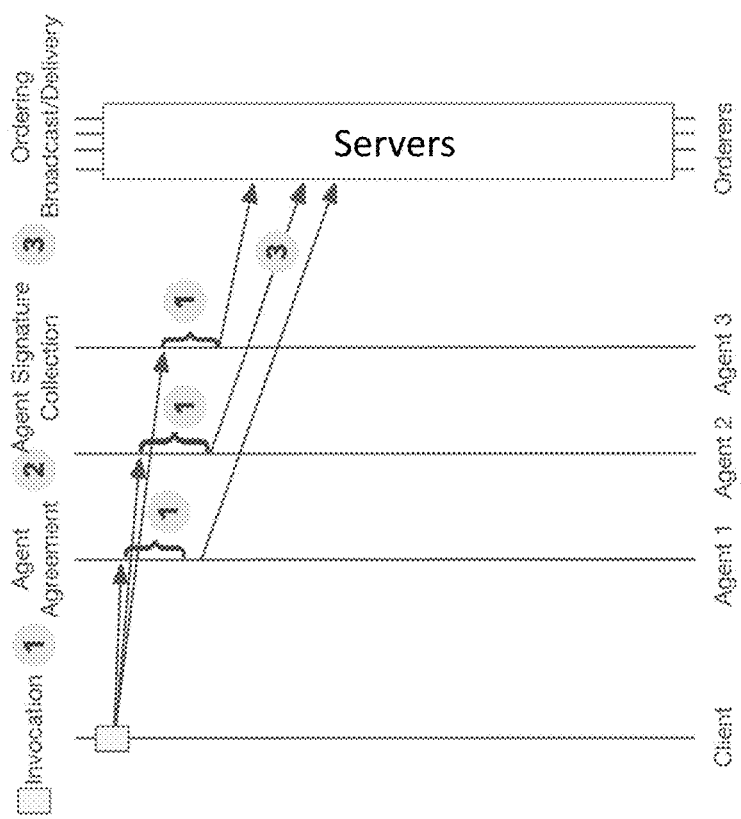
FIG. 15 is a chart which depicts data governance according to one embodiment of the present invention.
Figure 16:
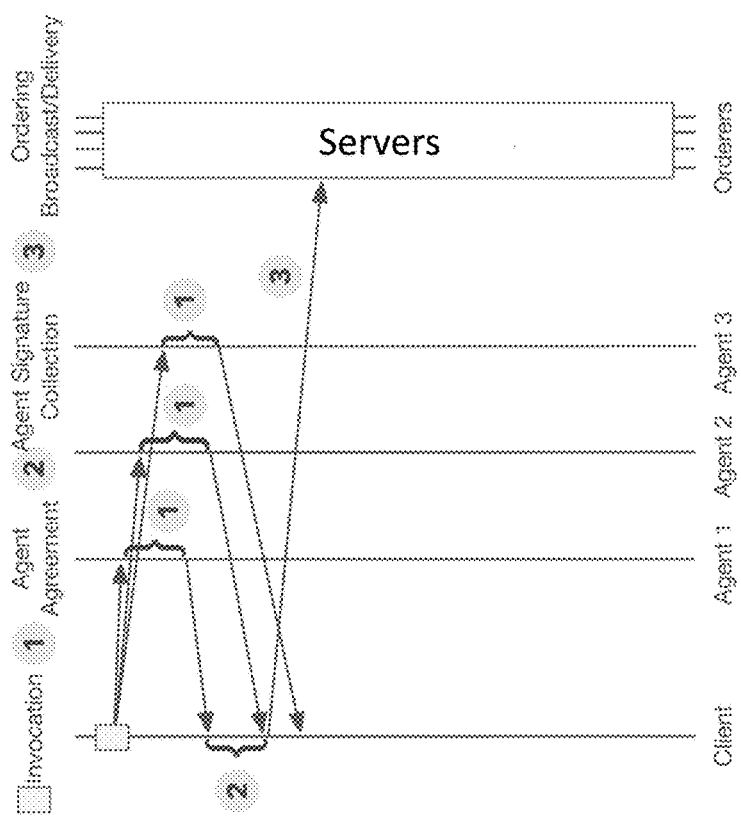
FIG. 16 is a chart which depicts data governance according to another embodiment of the present invention.

In some embodiments, as shown in FIG. 15, the architecture requires the usage of threshold signature to provide fault tolerance, while in other embodiments, as shown in FIG. 16, the architecture requires only authenticated channels and requires a quorum of t servers to approve client requests to proceed. The first approach is more bandwidth-efficient and but requires clients to be online after submitting transactions.

Once again referring to FIG. 16, in some embodiments, the architecture only requires authenticated channels. In some embodiments, let n be the number of servers and M be the number of agents. The client request message m includes the user identity and an incremental sequence number. Let buf be the request queue of the servers to be ordered by the BFT process.

Upon receiving input(m), the client broadcasts (invoc, m) to agents for approval. Upon receiving the broadcast, the agent must determine if to approve or disapprove. If the agent approves m, the agent then broadcasts (beb, m) to the server. If the agent does not approve, the agent discards the request. The server, upon receiving (beb, m) from a threshold number t agents sets buf=buf∪{m}.

The systems and methods are configurable to scale horizontally. To achieve this, several distributed load agents are selected to help choose a specific set of servers for a transaction type. Any party is configured to contact load agents to get the information regarding which set of servers are responsible for all transactions with some transaction type. For a transaction type T, load agents jointly generate a distributed PRF value on T. It will be appreciated that the threshold PRF value is a deterministic yet an unpredictable value. No matter who asks for the server set selection, for a specific transaction type T, the set of servers is always fixed and cannot be manipulated by an adversary. In some embodiments, the value is precomputed and put in a reliable bulletin board, which is easily implemented using a BFT key-value store. To prevent the load agents from being compromised, the system contemplates choosing a large set of fully distributed agents. In some embodiments, a large set is a set of over one hundred fully distributed agents. It will be appreciated that the efficiency problem of selecting servers is a secondary concern, as this process is a one-time event. In some embodiments, to prevent the adversary from corrupting more than f replicas for a server set, the system uses more than 3f+1 servers.

The systems and methods also are configurable to utilize smart contracts and private smart contracts. In some embodiments, the systems and methods is configured to support multiple private smart contracts using either confidential BFT (i.e., BFT processing transactions privately) or TEE techniques. To achieve this, the private transaction shares which are stored in the form of threshold encryption are sent to a group of execution nodes (which, in some instances, are the servers running BFT protocols). These nodes will execute the transactions privately using any of the private smart contract approaches and put the results to the blockchains. The systems and methods described herein is configurable to allow multiple private smart contract approaches to co-exist. The transaction issuer (users) decides which private smart contract approach (any of the above) is to be used and decides which group of execution nodes (which can be the consensus nodes) are selected, by expressing and encoding the requirements in the vector labels or the label.

Being able to handle multiple private smart contracts is a major advantage to existing private smart contract platform, because users can flexibly choose methods that they deem most appropriate. This will increase the applicability and flexibility of private smart contracts. Such a feature is only enabled in the instant infrastructure which combines vector-label-input threshold encryption and a BFT system. Existing private smart contract platforms can support only one approach.

Referring to FIG. 7, the system architecture and the message flow according to one embodiment are shown. The client transactions are first handled through a request handler thread pool and the transactions are then relayed to the BFT core. The BFT core batches concurrent client transactions and assigns a sequence number to each transaction in the batch. The ordered client transactions are then processed by a write/read handler thread pool. Each thread processes a client transaction at a time and outputs a reply according to the operation type in the transaction.

The systems and methods divide transactions into transactions changing the system state (i.e., reg, advertise, write, pub, sub) and transactions that do not change system state (i.e., read). For the transactions which change the system state, the replies, client IDs, client transactions, and the sequence numbers are delivered to the BlockStore module. When the number of outputs reaches the BlockSize, the client transactions and their sequence numbers are sent to the BlockStore module and stored in the database as a block. After a block is written to the database, the replies and the corresponding client IDs are sent to the reply handler thread pool. The replies are then sent to the clients in parallel. For the transactions which do not change the system state, the write/read handler threads obtain the data from the database and generate replies. The client IDs, the data, and replies are forwarded to the reply handler thread pool. Then replies are sent to the client by the reply handler thread pool.

The following provides an example of implementation of the systems and methods of the present invention. The example contemplates implementation into a healthcare distribution system, but it will be appreciated the systems and methods have a wide range of various other implementation.

The example describes how to build a scalable, decentralized, intrusion-tolerant IHE (Integrating the Healthcare Enterprise) system that defends against Byzantine failures. According to IHE web "IHE is an initiative by healthcare professionals and industry to improve the way computer systems in healthcare share information. IHE promotes the coordinated use of established standards such as DICOM and HL7 to address specific clinical needs in support of optimal patient care. Systems developed in accordance with IHE communicate with one another better, are easier to implement, and enable care providers to use information more effectively."

Despite the goals, the computer systems and architectures proposed through IHE so far suffer from the following problems. Existing systems achieve only weak integrity and availability. Specifically, there are multiple single points of failure and vulnerability, impacting the system reliability and availability. Moreover, these systems do not systematically address Byzantine failures (arbitrary failures) or malicious attacks. The latency of IHE information exchange systems remain unsatisfactory. The exchange of time-sensitive information, in some embodiments, takes many hours or days to complete. These systems, especially for those perform cross-community health information sharing, do not scale well and lack flexibility. The existing systems leverage ad hoc confidentiality-preserving mechanisms, using legal or informal access control mechanisms. Fine grained and provably secure access control has not been proposed so far. There are many different systems for IHE, but there is not a systematic treatment of the design and implementation of the system. In views of these limitations, there exists an identified need for improved systems and methods for secure and reliable IHE.

Described herein is a novel design of IHE-compatible information system that improves the three most important systems goals integrity, availability, and confidentiality, with a central goal that there is not any single point of failure or vulnerability. Moreover, the system enhances the interoperability of IHE systems by providing a unified architecture that supports all major IHE functionalities. In addition, the system is designed to be scalable, aiming to supporting a large number of providers and millions of end-customers. Additionally, the system design is modular, containing a number of key sub-systems addressing various needs of IHE.

In some embodiments, the systems and methods combine techniques from BFT protocols, threshold cryptography, novel broadcast encryption scheme, erasure coding, and bandwidth efficient reliable broadcast.

In some embodiments, the systems and methods are configured to incorporate erasure coding. An (m, n) erasure coding scheme takes as input m data fragments and outputs n (n>m) same-size coded fragments. Compared to replication, erasure coding provides much less space for the same reliability at the price of increasing bandwidth and system I/O.

In some embodiments, the systems and methods are configured to incorporate Byzantine reliable broadcast. A reliable broadcast allows a sender to reliably send a message to a group of recipients so that either all of the recipients deliver the message or none of them deliver the message, and once the message is delivered by one correct recipient, and it will be delivered by all correct recipients. Byzantine reliable broadcast is one secure against Byzantine failures. For this purpose, the system uses erasure-coded variants of Byzantine reliable broadcast.

In some embodiments, the intrusion-tolerant IHE system consists a number of subsystems including, but not limited to: a pub/sub system that links IHE actors, a reliable storage system that stores the data, an optional storage metadata service, an erasure-coded storage, a healthcare provider directory service, and a patient identity management service.

In some embodiments, the systems include multiple sub systems. In some embodiments, the system includes a pub/sub subsystem and a storage subsystem. The pub/sub system serves as the messaging system among IHE actors, and the storage system reliably stores the Medicare data. They two systems could work independently, or together as a single system.

In some embodiments, the two subsystems operate independently. In such embodiments, the pub/sub system is similar to those already disclose herein and BFT is utilized to implement a reliable storage and an optional storage metadata service. The benefit to this configuration is that the pub/sub system is used as an independent system and this incurs minimal system intrusions to the existing infrastructure where a storage system has already existed.

In some embodiments, the subsystems operate as one. In such embodiments, the brokers in the pub/sub system also serve as a reliable storage platform to keep and maintain publisher and subscriber persistent data. A similar approach is utilized to configure the system for fine-grained access control as described herein. Thus, the system is not just an information exchange platform, but a persistent storage platform. Such a configuration leads to some interesting benefits compared to running two services independently, as now brokers not only match future publications with subscriptions, but also flexibly match stored and persistent publications with subscriptions in a configurable manner (e.g., by defining a time window for stored data).

In some embodiments, the systems and methods are configurable to incorporate cold storage using secure erasure coding. To further save storage, the brokers transfer stable data (that are not frequently accessed any more) into erasure-coded storage data.

In some embodiments, the systems and methods require one designated broker to run an erasure-coded reliable broadcast protocol to erasure-coded servers. These erasure-coded servers are either the same as the brokers, or different from the brokers. The broadcast contains enough metadata and total order (sequence number order) in order to be retrievable later.

When receiving an erasure-coded fragment, the erasure-coded server will reply to all the relevant brokers within the BFT broker cluster. In a leader-based BFT protocol, the leader is the one to perform the broadcast. If with a reasonably long time no progress is made, a view change will be triggered. In a consensus-based BFT protocol, a random node (via a distributed PRF protocol) will be selected to perform the broadcast. If no progress is made, then a new node will be selected to ensure progress.

In some embodiments, the systems and methods are configurable to include a healthcare provider directory (HPD). The system uses a BFT protocol to implement a secure bulletin board for storing and managing HPD which is a directory of individual and organizational entities along with electronic services provided by those entities.

In some embodiments, the systems and methods are configurable to include patient identity management. The system incorporates a secure bulletin board using BFT protocols to maintain the patient identity information. The system encrypts the sensitive information leaving information that is necessary for patient matching in public.

The systems and methods described herein are extensible to handle privacy-preserving patient matching. The system leverages distributed oblivious PRF based, server-aided secure deduplication.

In some embodiments, an IHE information exchange system is able to override a patient specified privacy block due to eminent danger to that patient.

In some embodiments, the systems are configured to support this by adding a rule to the brokers so that once receiving an emergency management department exception, the brokers collaborate to decrypt the corresponding file or the key to encrypt the file.

In some embodiments, the systems and methods described here are configurable to support an audit. Our system could store all the ciphertexts and when an audit procedure is needed, the broker sends the corresponding threshold decryption shares to the auditor, who verify the correctness of the audited information.

In some embodiments, the present invention is executed as a computer program. In some embodiments, the bits for executing the computer program are located on a non-transitory computer readable medium. In some embodiments, the non-transitory computer readable medium is a central server. In some embodiments, the central server is connected via a communications network to various computing devices of system users. In some embodiments, the computing devices of system users are mobile computing devices, such as a smart phone. In some embodiments, the mobile computing device communicates with the non-transitory computer readable medium via an application installed on the device.

In some embodiments, the computer program, devices, systems, and methods of the present invention are implemented in hardware, software, firmware, or combinations thereof executing the present invention, which broadly comprises server devices, computing devices, a communications network, and a user ID (account number, etc.). In some embodiments, the server devices include computing devices. In some embodiments, the computing devices provide access to one or more general computing resources, such as Internet services, electronic mail services, data transfer services, and the like. In some embodiments, the server devices also provide access to a database that stores information and data. In some embodiments, the information and data includes, system user information (ID, account number, etc.), or the like, or other information and data necessary and/or desirable for the implementation of the computer program, devices, systems, and methods of the present invention.

In some embodiments, the server devices and the computing devices include any device, component, or equipment with a processing element and associated memory elements. In some embodiments, the processing element implements operating systems, and in some such embodiments is capable of executing the computer program, which is also generally known as instructions, commands, software code, executables, applications (apps), and the like. In some embodiments, the processing element includes processors, microprocessors, microcontrollers, field programmable gate arrays, and the like, or combinations thereof. In some embodiments the memory elements are capable of storing or retaining the computer program and in some such embodiments also store data, typically binary data, including text, databases, graphics, audio, video, combinations thereof, and the like. In some embodiments, the memory elements also are known as a "computer-readable storage medium" and in some such embodiments include random access memory (RAM), read only memory (ROM), flash drive memory, floppy disks, hard disk drives, optical storage media such as compact discs (CDs or CDROMs), digital video disc (DVD), Blu-Ray™, and the like, or combinations thereof. In some embodiments the server devices further include file stores comprising a plurality of hard disk drives, network attached storage, or a separate storage network.

In some embodiments, the computing devices specifically include mobile communication devices (including wireless devices), work stations, desktop computers, laptop computers, palmtop computers, tablet computers, portable digital assistants (PDA), smart phones, and/or wearable devices and the like, or combinations thereof. In some embodiments, the computing devices also include voice communication devices, such as cell phones or landline phones. In some embodiments, the computing device has an electronic display, such as a cathode ray tube, liquid crystal display, plasma, or touch screen that is operable to display visual graphics, images, text, etc. In some embodiments, the computer program of the present invention facilitates interaction and communication through a graphical user interface (GUI) that is displayed via the electronic display. The GUI enables the user to interact with the electronic display by touching or pointing at display areas to provide information to the user control interface. In some embodiments, the computing device includes an optical device such as a digital camera, video camera, optical scanner, or the like, such that the computing device is configured to capture, store, and transmit digital images and/or videos, bar codes or other identification information.

In some embodiments the computing devices includes a user control interface. In some embodiments, the user control interface enables one or more users to share information and commands with the computing devices or server devices. In some embodiments, the user interface facilitates interaction through the GUI described above or, in other embodiments comprises one or more functionable inputs such as buttons, keyboard, switches, scrolls wheels, voice recognition elements such as a microphone, pointing devices such as mice, touchpads, tracking balls, styluses. In some embodiments, the user control interface also include a speaker for providing audible instructions and feedback. In some embodiments, the user control interface comprise wired or wireless data transfer elements, such as a communication component, removable memory, data transceivers, and/or transmitters, to enable the user and/or other computing devices to remotely interface with the computing device.

In some embodiments, the communications network is wired, wireless, and/or a combination thereof, and in various embodiments includes servers, routers, switches, wireless receivers and transmitters, and the like, as well as electrically conductive cables or optical cables. In some embodiments, the communications network includes local, metro, and/or wide area networks, including the Internet and/or other cloud networks. In some embodiments, the communications network include cellular and/or mobile phone networks, as well as landline phone networks, public switched telephone networks, fiber optic networks, or the like.

In some embodiments, both the server devices and the computing devices are connected to the communications network. In some embodiments, server devices communicate with other server devices or computing devices through the communications network. In some embodiments, the computing devices communicate with other computing devices or server devices through the communications network. In some embodiments, the connection to the communications network is wired, wireless, and/or a combination thereof. In some embodiments, the server devices and the computing devices include components to establish a wired and/or a wireless connection.

In some embodiments, the present invention is an executable computer program which runs on computing devices. In some embodiments, the computer program runs on one or more server devices. In some embodiments a first portion of the program, code, or instructions execute on a first server device or a first computing device, while a second portion of the program, code, or instructions execute on a second server device or a second computing device. In some embodiments, other portions of the program, code, or instructions execute on other server devices as well. In some embodiments information is stored on a memory element associated with the server device. In some embodiments, the information is remotely accessible to users of the computer program via one or more computing devices. In some embodiments, the information is directly stored on the memory element associated with the one or more computing devices of the user. In some embodiments, a portion of the information is stored on the server device, while another portion is stored on the one or more computing devices. It will be appreciated that in some embodiments the various actions and calculations described herein as being performed by or using the computer program are performed by one or more computers, processors, or other computational devices, such as the computing devices and/or server devices, independently or cooperatively executing portions of the computer program.

In some embodiments, the present invention is accessible to one or more user via one or more electronic resource, such as an application, a mobile "app," or a website. In some embodiments, portions of the computer program are embodied in a stand-alone program downloadable to a user's computing device or in a web-accessible program that is accessible by the user's computing device via the network. In some embodiments, the stand-alone program includes a downloadable version of the computer program stored, at least in part, on the server device. In some embodiments, a user downloads at least a portion of the computer program onto the computing device via the network. In some embodiments, after the computer program has been downloaded, the program is installed on the computing device in an executable format. In some embodiments, the web-accessible computer program is configured to allow a user to simply access the computer program via the network (e.g., the Internet) with the computing device.

In some embodiments, the present invention may provide a method for encryption, the method comprising the steps of: generating a public key, a verification key, a secret key, and a label; encrypting a message, wherein said encryption generates a ciphertext; pairing a label within said ciphertext, said label being retrievable by a label extraction algorithm; generating a decryption share; validating said decryption share against pre-defined compliance conditions; and combining one or more decryption shares by utilizing said verification key, said ciphertext, and said decryption share to output said message in plaintext. The method of claim 1, wherein said encryption is threshold encryption. In some embodiments, said label is a variable-length vector.

In some embodiments, the present invention may provide an encryption system, the system comprising: one or more computing devices having a processor coupled to a memory storing computer-readable code, configured to perform the steps: generating a public key, a verification key, and a secret key; algorithmically encrypting a message, wherein said encryption generates a ciphertext; incorporating a label with said ciphertext during encryption, said label being retrievable by a label extraction algorithm; generating a decryption share; validating that said decryption share complies with pre-defined compliance conditions; and combining one or more decryption share by utilizing said verification key, said ciphertext, and said decryption share to output said message in plaintext. In some embodiments, said label is a variable-length vector.

In some embodiments, the present invention may provide a method for selectively distributing publications, the method comprising the steps: registering a publisher with a server by providing one or more publisher attributes to the server; registering a subscriber with the server by providing one or more subscriber attributes and one or more subscription interests to the server; storing by the server the one or more publisher attributes, the one or more subscriber attributes, and the one or more subscription interests; encrypting by said publisher a publication, said encrypting including a label with one or more access control rules; sending by said publisher said publication to a server; receiving by said server said publication from said publisher; assigning by said server an order number to said publication; determining by the server if said subscriber is both authorized and interested by comparing said one or more subscriber attributes and said one or more subscriber interests against said one or more publisher attributes and said one or more access control rules; delivering by said server said publication to said subscriber, said publication including at least one decryption share; and receiving by said subscriber said publication from said server along with said at least one decryption share. The method of claim 6, wherein said encryption is threshold encryption. In some embodiments, said label is a variable-length vector label.

In some embodiments, the present invention may provide a conditional access control system, the system comprising: a client configured to perform the steps of; broadcasting one or more attributes to one or more server, broadcasting corresponding proof to said one or more server as a registration transaction, and receiving a threshold number of matching replies from said one or more server and subsequently completes the registration transaction.

In some embodiments, the present invention may provide a conditional access control system, the system comprising: a server configured to perform the steps of; receiving a broadcast from a client, said broadcast being a registration transaction configured to perform the steps verifying one or more attributes associated with the broadcast, assigning a sequence number to said registration transaction and stores said transaction in sequence order number, and sending a response to said client, said response signaling the success of registration.

In some embodiments, the present invention may provide a conditional access control system, the system comprising: a client configured to perform the steps of, broadcasting one or more attributes to one or more server, broadcasting corresponding proof to said one or more server as a registration transaction, and receiving a threshold number of matching replies from said one or more server and subsequently completes the registration transaction, a server configured to perform the steps of; receiving a broadcast from a client, said broadcast being a registration transaction verifying one or more attributes associated with the broadcast, assigning a sequence number to said registration transaction and stores said transaction in sequence order number, and sending a response to said client, said response signaling the success of registration.

In some embodiments, the present invention may provide a method of conditional access control registration, the method comprising: broadcasting by a client one or more attribute to one or more server, wherein the broadcast also includes corresponding proof, the broadcast and proof defining a registration transaction; receiving by a server said broadcast; verifying by said server said one or more attributes associated with the broadcast; assigning by said server a sequence number to said registration transaction; storing by said server said registration transaction in sequence order number; sending by said server a response to said client, said response signaling the success of registration; receiving by said client a threshold number of matching responses from one or more server; and completing by the client the registration transaction.

In some embodiments, the present invention may provide a conditional access control system, the system comprising: a client configured to perform the steps of, encrypting a transaction, said transaction having one or more variables stored in a vector, sending said transaction to server, and receiving from said server a result, said result including ordered client transaction information. In some embodiments, the encryption is vector input label threshold encryption.

In some embodiments, the present invention may provide a conditional access control system, the system comprising: a server configured to perform the steps of; receiving an encrypted transaction, ordering said transaction with one or more prior transactions, and delivering results of said ordering to a client. In some embodiments, the encryption is vector input label threshold encryption.

In some embodiments, the present invention may provide a conditional access control system, the system comprising: a client configured to perform the steps of, encrypting a transaction, said transaction having one or more variables stored in a vector, sending said transaction to server, and receiving from said server a result, said result including ordered client transaction information, a server configured to perform the steps of, receiving an encrypted transaction, ordering said transaction with one or more prior transactions, and delivering results of said ordering to a client. In some embodiments, the encryption is vector input label threshold encryption.

In some embodiments, the present invention may provide a method of conditional access control registration, the method comprising: encrypting by a client a transaction, said transaction having one or more variables stored in a vector; sending by said client said transaction to a server; receiving by said server said transaction; ordering by said server said transaction with prior transactions, sending by said server an ordered list, said ordered list composed of said transaction with prior transactions; and receiving by said client the ordered list. In some embodiments, the encryption is vector input label threshold encryption.

In some embodiments, the present invention may provide a conditional access control system, the system comprising: a client configured to perform the steps of; sending a transaction to one or more server, said transaction being a read request, receiving a decryption share from one or more server, and utilizing said decryption share to obtain a plaintext transaction.

In some embodiments, the present invention may provide a conditional access control system, the system comprising: a server configured to perform the steps of; receiving a transaction from a client, said transaction being a read request; determining if said client is authorized for the particular transaction, said determination being made by checking access control policies associated with the transaction against one or more client attribute; and sending a decryption share to said client if the client is allowed to have access to the transaction.

In some embodiments, the present invention may provide a conditional access control system, the system comprising: a client configured to perform the steps of; sending a transaction to one or more server, said transaction being a read request, receiving a decryption share from one or more server, and utilizing said decryption share to obtain a plaintext transaction, a server configured to perform the steps of; receiving a transaction from a client, said transaction being a read request; determining if said client is authorized for the particular transaction, said determination being made by checking access control policies associated with the transaction against one or more client attribute; and sending a decryption share to said client if the client is allowed to have access to the transaction.

In some embodiments, the present invention may provide a method of conditional access control registration, the method comprising: a client performing the steps: sending a transaction to one or more server, said transaction being a read request; receiving a decryption share from one or more server, utilizing said decryption share to decrypt said transaction into plaintext, a server performing the steps: receiving said transaction from said client, determining if said client is authorized for said transaction by checking pre-defined access control policies associated with the transaction against one or more attributed associated with said client, and sending a decryption share to said client if said client is authorized.

In some embodiments, the present invention may provide a publish-subscribe system, the system comprising: a publisher configured to perform the steps of; registering with a server, such registration including publisher attributes, encrypting a topic and access control rules; and sending a publication to one or more server.

In some embodiments, the present invention may provide a publish-subscribe system, the system comprising: a server configured to perform the steps of, receiving a publication from a publisher, ordering the publication along with any other existing publications, determining which subscribers are both authorized and interested, and delivering said publication to one or more subscriber.

In some embodiments, the present invention may provide a publish-subscribe system, the system comprising: a subscriber configured to perform the steps of, registering with a server, said registration including subscriber attributes and subscription interests, and receiving one or more ordered publication from said server, wherein receiving the one or more ordered publication includes receiving at least one decryption share to convert the publication to plaintext.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

What is claimed is:

1. A selective electronic distribution system, the system comprising:
   a plurality of clients including a subset of at least one permissioned subscriber and at least on permissioned publisher, wherein a client from a plurality of clients configured to perform the steps of:
      sharing at least one attribute and a corresponding proof of validity of the at least one attribute to a plurality of Byzantine Fault Tolerance (BFT) servers, wherein said BFT servers run a (t,n) threshold encryption scheme,
      receiving a reply from one or more of the BFT servers,
      registering with the plurality of BFT servers upon receipt of a positive reply from f+1 BFT servers, wherein f is the upper bound of the number of faulty servers
   each permissioned publisher configured to perform the steps of:
      advertising a publication type,
      encrypting a publication using said (t,n) threshold encryption scheme, said encryption including at least one VLI access control rule configured to support an arbitrary or variable number of labels, said labels being generated by the (t,n) threshold encryption scheme, wherein said encryption produces a ciphertext of said publication, and
      sending said publication to the plurality of BFT servers,
   each permissioned subscriber configured to perform the step of:
      submitting to the plurality of BFT servers one or more subscription interest,
   each BFT server of the plurality of BFT servers including attribute-based access control rules and configured to perform the steps of:
      receiving the at least one attribute and subsequently initiating a comparison of the at least one attribute to the access control rules to determine whether access is permitted,
      verifying the comparison with two or more additional BFT servers of the plurality of BFT servers,
      sending a reply to the client, wherein the positive reply signals the success of registration,
      assigning a sequence number to said registration by running an underlying BFT protocol,
      storing the registration in sequence number order,
      broadcasting to all permissioned subscribers the publication type, wherein said broadcasting to all permissioned subscribers is performed via a Naor-Naor-Lotspiech broadcast encryption scheme with distributed key distribution, thereby supporting an unbounded number of potential recipients,
      receiving from the at least one permissioned subscriber at least one subscription interest,
      ordering and storing said at least one subscription interest,
      verifying the order of the at least one subscription interest with two or more additional BFT servers of the plurality of BFT servers, said verification including comparing the BFT server's order for the subscription interest against the ordering of said two or more additional BFT servers; wherein upon successful verification the plurality of BFT servers agree upon a BFT total order for the subscription interest,
      receiving the publication from the permissioned publisher,
      assigning an order number to the publication, and
      verifying said order number with at least two other BFT servers within the plurality of BFT servers, said verification including comparing the BFT server's order for the publication against the ordering of said two or more additional BFT servers; wherein upon successful verification the plurality of BFT servers agree upon a BFT total order for the publication.

2. The system of claim 1, further comprising:
   the client configured to perform the steps of:
      encrypting a transaction using vector-label-input (VLI) threshold encryption, said transaction having at least two transaction attributes, wherein at least one of said transaction attributes is an access control rule to the system;
      sending said transaction to the plurality of BFT servers, and
      receiving from two or more BFT servers of the plurality of servers a result, said result including ordered client transaction information;
   each BFT server of the plurality of BFT servers configured to additionally perform the steps:
      receiving said transaction and ordering said transaction with prior transactions,
      verifying the ordering with two or more additional BFT servers of the plurality of BFT servers, said verification including comparing the BFT server's order for the transaction against the ordering of said two or more additional BFT servers; wherein upon successful verification the plurality of BFT servers agree upon a BFT total publication order;
      assigning a sequence number to said transaction;
      storing said transaction;
      executing an associated operation in sequence number order; and
      delivering results of said BFT total publication order to the client, said results being said ordered client transaction information.

3. The system of claim 1, further comprising:
   each BFT server of the plurality of BFT servers additionally configured to perform the steps:
      determining if the permissioned subscriber is both authorized and interested by comparing the subscription interest and the attribute against the access control rules and an attribute associated with the permissioned publisher, and
      delivering at least one decryption share to the permissioned subscriber, said at least one decryption share being generated by the (t,n) threshold encryption scheme;

the permissioned subscriber additionally configured to perform the steps:
- receiving said at least one decryption share from at least one BFT server of the plurality of BFT servers;
- receiving said publication, in ciphertext form, from the permissioned publisher; and
- utilizing the at least one decryption share to decrypt said ciphertext, resulting in a plaintext version of said publication;

the permissioned publisher additionally configured to perform the step:
- sending to the permissioned subscriber said ciphertext of said publication.

4. The system of claim 1, wherein prior to sending a response to the client, each BFT server of the plurality of BFT servers additionally performs the steps of:
- ordering the attribute,
- storing the attribute,
- verifying said ordering with the ordering of at least one other BFT server within the plurality of BFT servers, wherein said attribute is an attribute of the client, and
- upon successful verification of similar ordering, establishing said ordering as a Total Order of the attribute.

5. A method for selectively distributing publications, the method comprising the steps:
- creating attribute-based access control rules,
- registering by a client from a plurality of clients with the system, said registration including sharing with the system at least one attribute and corresponding proof of validity of the attribute;
- receiving by each Byzantine Fault Tolerant (BFT) server from a plurality of BFT servers from the client the attributes and subsequently initiating a comparison of the attributes to the access control rules,
- verifying the comparison with two or more additional BFT servers of the plurality of BFT servers;
- sending by each BFT server a reply to the client, a positive reply signaling the success of registration; and
- receiving by the client a threshold number of matching replies from two or more BFT servers of said plurality of BFT servers, said threshold number of matching replies being f+1 positive replies from the plurality of BFT servers, wherein f is the upper bound of the number of faulty servers,
- wherein the registration includes a (t,n) threshold encryption scheme including at least one VLI access control rule configured to support an arbitrary or variable number of labels, said labels being generated by the (t,n) threshold encryption scheme, wherein said encryption produces a ciphertext of said publication.

6. The method of claim 5, further comprising the steps:
- encrypting by the client a transaction, said transaction having at least one transaction attribute;
- sending by the client said transaction to the plurality of BFT servers;
- receiving by each BFT server of the plurality of servers said transaction and ordering said transaction with prior transactions;
- verifying by each BFT server the ordering with two or more additional BFT servers of the plurality of BFT servers, said verification including comparing the BFT server's order for the transaction against the ordering of said two or more additional BFT servers; wherein upon successful verification the plurality of BFT servers agree upon a BFT total publication order;
- delivering by each server of the plurality of servers results of said ordering to the client, said results being said ordered client transaction information; and
- receiving by the client from two or more BFT servers of the plurality of BFT servers a result, said result including ordered client transaction information.

7. The method of claim 6, further comprising the steps:
- sending by the client a read request to the plurality of BFT servers;
- receiving by each BFT server of the plurality of BFT servers a read request from the client;
- determining by each BFT server if the client is authorized for the particular read request, said determination being made by checking the access control rule associated with the transaction against the attribute;
- generating by each BFT server a reply, said reply being a positive reply if the client is allowed to have access to a transaction specified in the read request;
- receiving by the client said respective positive replies from two or more BFT servers of the plurality of BFT servers, thereby receiving at least two decryption shares;
- applying by the client a combination algorithm to the at least two decryption shares, and
- utilizing by the client a result of said combination algorithm to obtain a plaintext transaction.

8. The method of claim 5, wherein said plurality of clients includes a subset of at least one permissioned subscriber and at least one permissioned publisher.

9. The method of claim 8, further comprising the steps:
- advertising by the permissioned publisher a publication type;
- broadcasting by each BFT server of the plurality of BFT servers to the permissioned subscriber said publication type;
- submitting by the permissioned subscriber to the plurality of BFT servers a subscription interest;
- receiving by each BFT server from the permissioned subscriber the subscription interest;
- ordering by each BFT server and storing the subscription interest; and
- verifying by each BFT server the order of the at least one subscription interest with two or more additional BFT servers of the plurality of BFT servers, said verification including comparing the BFT server's order for the subscription interest against the ordering of said two or more additional BFT servers; wherein upon successful verification the plurality of BFT servers agree upon a BFT total order for the subscription interest,
- wherein the broadcasting by each BFT server is performed via a Naor-Naor-Lotspiech broadcast encryption scheme with distributed key distribution, thereby supporting an unbounded number of potential recipients.

10. The method of claim 9, further comprising the steps:
- encrypting by the permissioned publisher a publication using said VLI threshold encryption scheme, said encryption including a label with at least one access control rule, said label being generated by the VLI threshold encryption scheme, wherein said encryption produces a ciphertext of said publication;
- sending by the permissioned publisher the publication to the plurality of BFT servers;
- receiving by each BFT server the publication from the permissioned publisher;
- assigning by each BFT server an order number to the publication; and verifying by each BFT server said order number with at least two other BFT servers within the plurality of BFT servers, said verification including comparing each BFT server's order for the publication against the ordering of said two or more additional BFT servers; wherein upon successful verification the plurality of BFT servers agree upon a BFT total order for the publication.

11. The method of claim 10, wherein said label is a variable-length vector.

12. The method of claim 10, further comprising the steps:
determining by each BFT server if said the permissioned subscriber is both authorized and interested by comparing the subscription interest and the attribute against the access control rule and at least one attribute associated with the permissioned publisher; and
delivering by each BFT server at least one decryption share, said at least one decryption share being generated by the VLI threshold encryption scheme; and
receiving by the permissioned subscriber t said at least one decryption share,
sending by the permissioned publisher at said ciphertext of said publication,
utilizing by the subscriber said at least one decryption share to decrypt said ciphertext, resulting in a plaintext version of said publication.

\* \* \* \* \*

UNITED STATES PATENT AND TRADEMARK OFFICE
CERTIFICATE OF CORRECTION

PATENT NO. : 12,149,512 B2
APPLICATION NO. : 16/449227
DATED : November 19, 2024
INVENTOR(S) : Zhang et al.

It is certified that error appears in the above-identified patent and that said Letters Patent is hereby corrected as shown below:

On the Title Page

Column 1, Item (51), Under "Int. Cl.", Lines 2-3, delete
"*G06Q 20/38* (2012.01)
*H04L 9/40* (2022.01)".

Column 2, Item (57), Under "ABSTRACT", Line 10, delete ""crytographic" and insert
-- cryptographic --, therefor.

Column 1, in Item (56), under "OTHER PUBLICATIONS", Line 1, delete ""PubliyPrime:" and insert -- ""PublicPrime: --, therefor.

In the Specification

In Column 2, Line 36, delete "sever" and insert -- several --, therefor.

In Column 9, Line 66, delete "m'$_2$, . . . , m'$^{s'}$" and insert -- $m'_2, ... , m'_{s'}$ --, therefor.

In Column 13, Line 48, delete "sk," and insert -- sk$_i$ --, therefor.

In Column 17, Line 60, delete "sk," and insert -- sk$_i$ --, therefor.

In Column 20, Line 56, delete "hard-ware" and insert -- hardware --, therefor.

In Column 21, Line 3, delete "Vrf" and insert -- Vrf, --, therefor.

In Column 24, Line 7, delete "They" and insert -- The --, therefor.

In Column 31, Line 4, delete "with in" and insert -- within --, therefor.

Signed and Sealed this
Thirty-first Day of December, 2024

Derrick Brent
*Acting Director of the United States Patent and Trademark Office*